US006799141B1

(12) United States Patent
Stoustrup et al.

(10) Patent No.: US 6,799,141 B1
(45) Date of Patent: Sep. 28, 2004

(54) METHOD FOR DETERMINING THE CHANNEL GAIN BETWEEN EMITTERS AND RECEIVERS

(75) Inventors: Jakob Stoustrup, Skørping (DK); Anders La Cour-Harbo, Nibe (DK)

(73) Assignee: Beamcontrol APS, Aalborg Ost (DK)

( * ) Notice: Subject to any disclaimer, the term of this patent is extended or adjusted under 35 U.S.C. 154(b) by 0 days.

(21) Appl. No.: 09/980,858

(22) PCT Filed: Jun. 8, 2000

(86) PCT No.: PCT/DK00/00310

§ 371 (c)(1),
(2), (4) Date: Feb. 26, 2002

(87) PCT Pub. No.: WO00/77945

PCT Pub. Date: Dec. 21, 2000

(30) Foreign Application Priority Data

| Jun. 9, 1999 | (DK) | 1999 00817 |
| Sep. 24, 1999 | (DK) | 1999 01368 |
| Oct. 20, 1999 | (DK) | 1999 01503 |
| Dec. 9, 1999 | (DK) | 1999 01720 |
| Dec. 9, 1999 | (DK) | 1999 01763 |
| Dec. 10, 1999 | (DK) | 1999 01777 |
| Jan. 18, 2000 | (DK) | 2000 00075 |
| Jan. 18, 2000 | (DK) | 2000 00087 |
| Mar. 22, 2000 | (DK) | 2000 00480 |

(51) Int. Cl.$^7$ ............... G01B 11/00; G01S 9/02; H04B 7/00

(52) U.S. Cl. ............. 702/159; 342/61; 342/192; 342/204; 345/158; 345/163

(58) Field of Search ................. 702/155, 158, 702/159, 90; 342/118, 192, 204; 267/99; 375/299; 345/157, 163, 167

(56) References Cited

U.S. PATENT DOCUMENTS

| 3,443,075 A | 5/1969 | Gloess ........................ 700/84 |
| 4,042,928 A | 8/1977 | Altes .......................... 342/192 |
| 4,210,931 A | 7/1980 | Bailey et al. ............... 386/112 |
| 4,224,678 A | 9/1980 | Lynch et al. ................ 708/203 |

(List continued on next page.)

FOREIGN PATENT DOCUMENTS

| DE | 40 27 338 A1 | 3/1992 |
| DE | 43 02 725 A1 | 6/1993 |
| DE | 43 07 490 A1 | 9/1994 |
| EP | 0 222 450 A | 5/1987 |

(List continued on next page.)

OTHER PUBLICATIONS

US 4,733,022, 3/1988, Wales et al. (withdrawn)
Dixon, Processing SPIE, vol. 2569, pp. 164–174 (1995).
Nonaka et al., IEEE Transactions on Instrumentation and Measurement, vol. 44, No. 3, pp. 771–774 (1995).
Chen, Proceedings of IEEE, XP002901378, pp. 472–475 (1994).
haykin, IEEE Ultrasonics Symposium, XP002901379, pp. 635–638 (1997).

*Primary Examiner*—John Barlow
*Assistant Examiner*—John H Le
(74) *Attorney, Agent, or Firm*—Harness Dickey

(57) ABSTRACT

A method for determining the channel gain between one or more emitter(s) and one or more receiver(s) by using a linear transform, such as a wavelet transform. Provides a fast and robust method for determining the channel gain, the signal being emitted with a very low power since received signals are easily resolved at the receiver. The method is employed in a three dimensional pointing device for a computer improving the possibility of moving the pointer in three dimensions. Information may be obtained about objects positioned in the signal path. May be employed for door openers or for determining the position of a remote control or for reducing "Cross talk" in electrical components.

54 Claims, 8 Drawing Sheets

U.S. PATENT DOCUMENTS

| | | | |
|---|---|---|---|
| 4,300,049 A | 11/1981 | Sturm | 250/339.09 |
| 4,542,375 A | 9/1985 | Alles et al. | 345/176 |
| 4,641,138 A * | 2/1987 | Opitz | 342/61 |
| 4,675,750 A | 6/1987 | Collins et al. | 386/112 |
| 4,691,446 A | 9/1987 | Pitches et al. | 33/516 |
| 4,706,499 A | 11/1987 | Anderson | 73/625 |
| 4,744,028 A | 5/1988 | Karmarkar | 705/8 |
| 4,807,029 A | 2/1989 | Tanaka | 348/400.1 |
| 4,851,616 A | 7/1989 | Wales et al. | 345/175 |
| 4,862,152 A | 8/1989 | Milner | 345/158 |
| 4,974,187 A | 11/1990 | Lawton | 708/402 |
| 4,991,148 A | 2/1991 | Gilchrist | 367/124 |
| 5,000,183 A | 3/1991 | Bonnefous | 600/437 |
| 5,014,134 A | 5/1991 | Lawton et al. | 382/240 |
| 5,294,970 A | 3/1994 | Dornbusch et al. | 356/141.1 |
| 5,384,725 A | 1/1995 | Coifman et al. | 708/801 |
| 5,486,833 A | 1/1996 | Barrett | 342/204 |
| 5,521,616 A | 5/1996 | Capper et al. | 345/156 |
| 5,526,299 A | 6/1996 | Coifman et al. | 708/801 |
| 5,588,023 A | 12/1996 | Ho | 375/238 |
| 5,684,693 A | 11/1997 | Li | 702/6 |
| 5,825,936 A | 10/1998 | Clarke et al. | 382/261 |
| 5,867,118 A | 2/1999 | McCoy et al. | 342/90 |
| 5,867,146 A | 2/1999 | Kim et al. | 345/158 |
| 5,910,779 A | 6/1999 | Bulst et al. | 340/10.2 |
| 6,172,665 B1 * | 1/2001 | Bullister | 345/163 |

FOREIGN PATENT DOCUMENTS

| | | |
|---|---|---|
| EP | 0 637 141 A2 | 2/1995 |
| EP | 0 650 138 A1 | 4/1995 |
| EP | 0 785 420 A2 | 7/1997 |
| GB | 2 203 315 A | 10/1988 |
| GB | 2 280 504 A | 2/1995 |
| JP | 08255053 A | 10/1996 |
| JP | 09016325 A | 1/1997 |
| JP | 09265346 A | 10/1997 |
| JP | 10276987 A | 10/1998 |
| WO | WO 96/27951 | 9/1996 |
| WO | WO 97/14138 | 4/1997 |
| WO | WO 98/10528 | 3/1998 |

* cited by examiner

Figure 1: Different types of on/off signals.

METHOD FOR DETERMINING THE CHANNEL GAIN BETWEEN EMITTERS AND RECEIVERS

This application is the national phase under 35 U.S.C. § 371 of PCT International Application No. PCT/DK00/00310 which has an International filing date of Jun. 8, 2000, which designated the United States of America and was published in English.

FIELD OF THE INVENTION

The present invention relates to emission and reception of signals and to obtaining information regarding the signal path by obtaining information regarding the emitted and/or the received signals.

More particularly the present invention relates to a method for determining channel gain, wherein the received signal is transformed by means of a linear transform. The present invention further relates to a number of applications of the method, such as position determination of an emitter or of a reflective or refractive object, a pointing device for a computer, a door opening device, a remote control for e.g. an audio system, and reduction of "cross talk" in electrical components.

BACKGROUND

It is known to use wavelet transforms for transforming emitted and/or received signals. U.S. Pat. No. 5,384,725 (Coifman et al.) discloses a method and apparatus for encoding and decoding using wavelet-packets. This reference is concerned about the process of encoding/decoding a video or audio signal as such in order to compress/decompress the information contained in the signal. In particular this reference is concerned about finding the best basis for the wavelet transform to be used. The wavelet transform is used to transform an unknown signal.

Pointing devices for computers, such as the conventional "computer mouse" or so-called "touch screens" are known. However, the known devices require the hand of the user to be in a particular area in order to operate the device. This area is normally positioned in such a way that the user's arm is put in a more or less awkward position, and the continuous use of such devices frequently results in overstrain of the muscles and/or other parts of the user. Furthermore, conventional pointing devices are normally confined to being moved in only two dimensions. Three dimensional movements of the pointer on the computer screen may be performed by means of such pointing devices. However, this is very difficult since it is not natural to perform three dimensional movements by moving a device in only two dimensions. So-called "touch screens" require the user to actually touch the computer screen, thereby applying grease and/or other kinds of unwanted dirt to the screen.

It is desirable to be able to use a chosen linear transform to generate a particular signal, and to use the transform to obtain information relating to elements of the signal path. It is thus an object of the present invention to provide a method for obtaining such information when emitting and receiving signals. It is a further object of the present invention to provide an improved method of determining channel gain between one or more emitter(s) and one or more receiver(s), the method being fast as wells robust. It is an even further object of the invention to provide a method of determining channel gain between one or more emitter(s) and one or more receiver(s), wherein the battery power required is reduced as compared to known systems the received signal still being resolvable, even if it is very noisy. It is an even further object of the invention to provide a method for determining the position of an object placed in the signal path. It is an even further object of the present invention to provide a pointing device for a computer, the pointing device overcoming the above mentioned problems, in particular providing a more natural way of performing three dimensional movements on the computer screen. It is an even further object of the present invention to provide a method for eliminating or at least to a certain extend reducing the unintentional occurrence of a signal in one conductor of electronic equipment, the signal being intentionally present in another conductor of the equipment (so-called "cross talk").

SUMMARY

Thus, according to the present invention is provided a method for determining the channel gain(s) between one or more emitter(s) and one or more receiver(s), the method comprising the steps of emitting a first output signal by means of a first emitter, the first output signal being deterministic and containing an interval of frequencies, receiving a first input signal by means of a first receiver, determining a transformed first input signal by transforming said first input signal by means of a predetermined linear transform, determining a first channel gain by means of comparison of said transformed first input signal and a predetermined original first signal being equal to said first output signal being emitted and received noiselessly with a known channel gain and being transformed by means of said linear transform.

The first output signal is deterministic, i.e. it is not a completely random signal (such as "white noise"). It may, however, be a pseudo-random signal Preferably, the first output signal is a generated signal sequence which is generated before the emission step. The same sequence may be used every time the method is performed. The first output signal contains an interval of frequencies as opposed to a signal containing only a single frequency or a finite number of frequencies, such as a signal of the kind being emitted from conventional door openers, e.g. such as the ones known from super markets etc.

The linear transform is predetermined, i.e. it is chosen before the step of determining a transformed first input signal. The transform may be chosen initially, such as once and for all, so that the same transform is always used. Alternatively or additionally, a transform may be chosen each time the method is performed, i.e. the transform may be chosen dynamically based on the conditions of the current emission/reception of signals.

The comparison of the transformed first input signal and the original first signal may be a simple comparison of the signals, such as overlaying the signals and visually comparing them, or spectral subtraction of one signal from the other. It may alternatively or additionally be obtaining the inner product between the two signals.

The original first signal is equal to the first output signal being emitted and received noiselessly with a known channel gain and being transformed by means of the linear transform. The original first signal is thus preferably a synthetic signal which has been generated. This generated signal is then transformed by the inverse transform of the predetermined linear transform, emitted by the emitter (at this point it has "become" the first output signal), and received by the receiver (at this point it has "become" the first input signal). Thereby the comparison gives a measure of the noise which has been applied to the original signal from the emission (e.g. electrical noise in electrical components of the emitter), the transmission (e.g. reflection and/or refraction and/or absorption of at least part of the signal when travelling through a gas (e.g. atmospheric air or any other suitable gas) or when hitting one or more refractive and/or reflective and/or partially absorbing object(s)), and the reception (e.g. electrical noise in electrical components of the receiver). When in the present context the term "noise applied" is used, it should be understood as the intentional as well as the unintentional components being added to the signal during emitting/transmitting/receiving the signal. That is, it should be interpreted as comprising "wanted" information regarding the signal path, such as information originating from objects inserted in the signal path as well as "unwanted" regular noise, such as noise originating from external noise sources. The "noise applied" may even comprise the gain of the system, e.g. in form of a damping or an amplification.

Systematic errors (such as reflections from walls, or noise originating from external noise sources, such as remote controls, the sun, artificial light etc.) may be eliminated, or at least to a great extend reduced, by using the knowledge thus obtained, and information may be obtained regarding one or more object(s) which is/are inserted into the signal path. Most preferably, information relating to the reflective and/or refractive and/or absorbing characteristics of the object(s) is obtained.

The step of determining a transformed first input signal may further comprise the step of transforming said first input signal by means of at least a second predetermined linear transform.

In this case the first input signal is transformed using at least two different linear transforms. This may be an advantage if the first input signal comprises two or more components, e.g. originating from two or more different sources, such as two or more different emitters.

The step of determining a transformed first input signal may be performed by using a linear transform of full rank. Alternatively or additionally, it may be performed by using a convolution transform. In case the step of determining a transformed first input signal is performed by using a convolution transform, it may be performed by using a spectral transform or by using a spread spectrum transform. In case the step is performed by using a spectral transform, it may be performed by using a sine or cosine transform, such as a local sine or local cosine transform. Alternatively or additionally, the step may be performed by using a unitary transform, and/or a wavelet transform, and/or a Hadamard transform, and/or a Rudin-Shapiro transform, such as a symmetric Rudin-Shapiro transform.

In case a wavelet transform is used, and in case the basis chosen is linearly independent (or even orthogonal), it is very easy to determine at the receiver from which emitter (in case there is more than one) the received signal originates, even if the received signal is very noisy. Therefore, a minimum of battery power is needed at the emitter, since even a not very intensive signal will be resolvable at the receiver, since only very little actual information is needed at the receiver.

The method preferably, prior to emitting the first output signal, further comprises the step of transforming the predetermined original first signal by means of a linear transform being the inverse transform of the predetermined linear transform, thereby obtaining the first output signal as described above.

Preferably, the method further comprises the step of determining the original first signal from an obtained measure of noise applied to the first input signal. That is, an original first signal may be chosen according to the noise which is currently applied to emitted signals. The choice may e.g. be based on the characteristics of the noise, such as the frequency interval and/or the amplitude and/or the number of noise sources and/or other suitable characteristics of the noise. The first original signal may be specifically generated according to such characteristics each time the method is performed, or it may be chosen from a set of predetermined original first signals containing a finite number of different signals.

The "noise" applied to the signal may also, apart from actual unwanted noise components of the signal, comprise information regarding one or more object(s), where it is desirable to obtain this information.

The measure of noise may be obtained from a comparison of a prior transformed first input signal and the respective prior original first signal. In this embodiment comparisons relating to prior emissions/receptions are stored, e.g. in a look-up table. In this manner information regarding systematic errors may be obtained, and such errors may thus be eliminated from the signal, as described above, so that only wanted "noise" information remains.

Thus, the step of determining the original first signal may be performed repeatedly so as to obtain an adaptive determination of the channel gain.

The measure of noise may be obtained in a number of different ways. It may be done either before or after the transformation of the first input signal. The measure may be based upon e.g. the energy of the signal, the scattering of the signal, the entropy of the signal, the frequency content of the signal, the signal to noise ratio (SNR) of the signal, and/or any other suitable measure. These measures may be obtained from the full signal or from a part of the signal. Since the original first signal is known (only the intensity of this signal is unknown), it is further possible to, at least substantially, separate the received input signal into a component originating from the original signal and a noise component originating from different noise sources of the system. An appropriate guess of the intensity may be made thus giving a "sample-by-sample" picture of the noise of the system, whereby the noise properties of the system may be determined.

Preferably the method further comprises the step of choosing a suitable transform for transforming the first input signal. This step is performed prior to the step of determining a transformed first input signal, and the choice is made based on a previously obtained measure of noise applied to the first input signal.

The previously obtained measure of noise applied to the first input signal may be obtained as described above. The transform may be chosen from a set of predetermined linear transforms containing a finite number of different linear transforms. The choice may be made in such a way that one type of linear transform is made when the environment is very noisy, and another transform is chosen when very little noise is present The choice is made in such a way that the comparison is as accurate as possible while at the same time ensuring that a not too large processing power will be required. Most preferably, a Rudin-Shapiro transform is chosen when the environment is very noisy, and a wavelet transform is chosen when very little noise is present.

The transform may be chosen before the first output signal is emitted or after the first input signal is received. In case the transform is chosen before the first output signal is emitted, the choice is most preferably made based upon measures of the noise of the system obtained by prior measurements as described above. In case the transform is chosen after the first input signal is received, the choice may alternatively or additionally be made based upon other appropriate factors, such as the noise currently being in the signal, the frequency content of the signal, and/or any other suitable measure as described above.

The step of emitting a first output signal may be performed by emitting an electromagnetic output signal or by emitting an-acoustic output signal. It may attentively or additionally be performed by emitting any other suitable output, such as a particle signal, e.g. electrons or α-particles or any other suitable kind of particles, including photons, e.g. photons originating from radioactive decays or from fluorescence. Alternatively or additionally it may be performed by means of a water jet, the emitter in this case comprising a tap or the like for applying water to the emitter.

The step of receiving a first input signal may be performed by receiving an electromagnetic input signal or by receiving an acoustic input signal. It may alternatively or additionally be performed by receiving any other suitable output, such as a particle signal, e.g. electrons or α-particles or any other suitable kind of particles, including photons, e.g. photons originating from radioactive decays or from fluorescence. Alternatively or additionally it may be performed by receiving a water jet.

Preferably, at least the transforming of the first input signal and the comparison of the transformed first input'signal and a predetermined original first signal is performed by means of digital processing means.

The digital processing means is preferably a computer device, such as a personal computer (PC), a DSP (dedicated hardware), or a terminal connected to a main frame system.

Preferably, the method further comprises the step of reflecting and/or transmitting the first output signal using an object, the step being performed prior to the step of receiving a first input signal.

Such an object could be any kind of suitable object, such as a solid object, e.g. the hand of a human being, a refractive object, such as a prism, a window, or an optic fibre, and/or a reflective object, such as a mirror or a wall, and/or it may be a suitable gas, where the gas maybe positioned in a gas cell or the like or it may even be atmospheric air. The object may be a "blocker", i.e. an object which at least substantially prevents the output signal from reaching the receiver. In this case the receiver will normally receive a signal. As soon as it does no longer receive a signal, this indicates that an object is present in the signal path. This approach is advantageously employed when the purpose of detecting the presence of an object is to cause a door to be opened as will be further described below.

Most preferably, the method further comprises the step of obtaining information about the object. Such information may comprise information regarding the reflective and/or refractive and/or absorbing characteristics of the object. It may additionally or alternatively comprise information regarding the shape and/or colour and/or position and/or size and/or any other suitable information of the object, such as the mere presence of the object in a certain region.

In one embodiment of the present invention the step of obtaining information about the object comprises obtaining information regarding at least part of a human being.

Such information may relate to the position of the hand of a human being, in which case the information may be used as an input for a pointing device for a computer device or it may be used to indicate the presence: of the hand within a certain area, thus indicating, e.g., that a door should be opened in order to let the, person pass. This will be described in further detail below.

Alternatively or additionally, such information may relate to obtaining tomographic data of at least part of a human body. In this case the signals involved are preferably γ-rays and/or X-rays and/or ultra sound. The technique may further be used in scanning devices employing magnetic resonance (MR). In this embodiment a plurality of emitters and preferably a plurality of receivers will normally be employed, the emitters and receivers being substantially equally distributed around the region which is of interest. This will result in a scanning device giving a scanning result which comprises less noise than conventional scanners.

In a preferred embodiment the method further comprises, the steps of emitting a second output signal by means of a second emitter, the second signal being deterministic and containing an interval of frequencies, receiving the first input signal by means of the first receiver, determining the transformed first input signal by transforming said first input signal by means of a predetermined linear transform, determining a second channel gain by means of comparison of said transformed first input signal and a predetermined original second signal being equal to said second output signal being emitted and received noiselessly and with a known channel gain, wherein the predetermined original first signal and the predetermined original second signal are linearly independent.

In this embodiment two emitters and one receiver are employed.

In another preferred embodiment the method further comprises the steps of receiving a second input signal by means of a second receiver, determining a transformed second input signal by transforming said second input signal by means of a predetermined linear transform, determining a second channel gain by means of comparison of said transformed second input signal and the predetermined original first signal being equal to said first output signal being emitted and received noiselessly and with a known channel gain.

In this embodiment two receivers and one emitter are employed.

In another preferred embodiment the method further comprises the steps of emitting a second output signal by means of a second emitter, the second signal being deterministic and containing an interval of frequencies, receiving a second input signal by means of a second receiver, determining a transformed second input signal by transforming said second input signal by means of a predetermined linear transform, determining a second channel gain by means of comparison of said transformed second input'signal and the predetermined original first signal, determining a third channel gain by means of comparison of the transformed first input signal and a predetermined original second signal being equal to said second output signal being emitted and received noiselessly and with a known channel gain, determining a fourth channel gain by means of comparison of the transformed second input signal and the predetermined original second signal, wherein the predetermined original first signal and the predetermined original second signal are linearly independent.

In this embodiment two emitters and two receivers are employed.

In the three embodiments described immediately above it is possible to determine the position of an object being positioned in the signal paths.

In the embodiment where two emitters and two receivers are employed the step of emitting the first output signal and the step of emitting the second output signal may be performed by emitting signals being significant for each of the emitters.

It is thus possible to distinguish the signals so as to determine from which emitter they originated, thereby obtaining additional information regarding the signal paths. The significance may be obtained by making sure that the signals are orthogonal or at least linearly independent, and/or it may be obtained be letting the signals having different frequency intervals and/or different amplitudes and/or they may differ in any other suitable manner.

In a very preferred embodiment the method further comprises the steps of emitting a plurality of output signals by means of a plurality of emitters, each of the plurality of signals being deterministic and containing an interval of frequencies, receiving a plurality of input signals by means of a plurality of receivers, determining a plurality of transformed input signals by transforming each of the input signals of said plurality of input signals by means of a predetermined linear transform, determining a plurality of channel gains by means of comparison of said plurality of transformed input signals with each of a plurality of predetermined original signals each being equal to one of said plurality of output signals being emitted and received noiselessly and with a known channel gain, wherein the predetermined original signals are linearly independent.

The predetermined original signals are preferably orthogonal.

Preferably, the step of emitting a plurality of output signals is performed by emitting signals being significant for each of the plurality of emitters as described above.

The method may further comprise the step of determining the position of an object based upon the determined channel gains. In this case the method may be used for providing an input to a pointing device for a computer device and/or it may be used for indicating the presence of a person, e.g. in front of a door, thereby causing the door to be opened in order to let the person pass.

The position of the object is preferably determined in three dimensions, but it may alternatively or additionally be positioned in two dimensions, in which case the movement of the object is normally confined to a certain plane. In this case the method may be used for providing an input to a pointing device for a computer device, the pointing device being similar to the known "computer mouse", but where the "device" which needs to be moved may be the hand or finger of the user, or it may be a "pointing object", such as a pen like object or a small sphere or any other suitable pointing object This gives a less awkward position of the hand of the user, thereby reducing the risk of the user getting strained muscles or the like. If the position of the object is determined in three dimensions this risk is even further reduced since the user may move his or her hand in a position which suits him or her, thereby making the movements even less awkward. Further, the pointer (i.e. the finger of the user or the suitable pointing object) is very easily moved in three dimensions, thereby providing a more natural way of operating a three dimensional pointer on the computer screen. This is very useful when graphical programmes, such as three dimensional computer games or architectural presentation programmes are used.

The method may further comprise the step of reflecting the emitted signing by the object, said step being performed after the step of emitting the signals, but before the step of receiving the signals.

The step of determining the position of an object may comprise the steps of determining the channel gains, determining relative distances of the object, said relative distances being based upon the determined channel gains, converting the relative distances into a three dimensional position.

The relative distances are preferably the distances between each emitter and/or receiver and the object If the relative positions of the emitters/receivers are known, the position of the object is readily determined from these relative distances.

The step of converting the relative distances into a three dimensional position may be performed by means of a neural network and/or it may be performed by means of geometrical observations.

The method may even further comprise the step of determining the motion of the object and/or the spatial orientation of the object The method may further comprise the steps of detecting the presence of an object in the vicinity of at least one of the one or more emitter(s); and/or in the vicinity at least one of the one or more receiver(s) by means of comparing the determined channel gain with a predetermined threshold value, performing a predetermined action in case the determined channel gain exceeds said predetermined threshold value.

The threshold value is very dependant on the situation, the characteristics of the object and on the kind of signal employed.

The predetermined action may be opening a door being in the vicinity of the object. In this case the "object" is preferably a person or a part of a person (such as the hand).

In an embodiment of the invention the step of emitting a first output signal is performed by using a movable emitter, and the step of receiving a first input signal is performed using at least two substantially stationary receivers, the method further comprising the steps of determining the distance between the emitter and each of the receivers from the determined channel gains, and determining the position of the emitter by combining the determined distances.

In another embodiment the step of emitting a first output signal is performed by using a movable emitter, and the step of receiving a first input signal is performed using at least three substantially stationary receivers, the method further comprising the steps of determining the mutual ratios between the determined channel gains, and determining the position of the emitter by combining the determined ratios.

The emitter may in the two above cases be a remote control for an audio and/or video system, or for any other suitable system. The method may in this case be employed for determining the position of the remote control, and, presuming that the person using the audio and/or video system is in the vicinity of the remote control, the position of this person. In the first mentioned embodiment the position is determined by a direct measurement of the distances between the emitter and each of the receivers. This requires a precise knowledge of the signal intensities. In the second mentioned embodiment only relative distances are measured, and this embodiment therefore does not require such precise knowledge.

As mentioned above, the emitter and the receivers are preferably comprised in an audio system, in which case the method further comprises the step of adjusting the loud speakers of the audio system according to the position of the first emitter, and thereby according to the position of the listener. This makes it possible to create an optimal sound environment around the listener, e.g. regarding the stereo effects and/or surround sound effects and/or the mutual volume of different components of the music (such as bass, treble, different instruments etc.).

In the following is given an example of the determining of the position of a movable emitter.

The following system determines the position of one emitter by means of several receivers. The emitter emits either a wavelet signal or a Rudin-Shapiro (RS) sequence. In both cases the various receivers receive the emitted signal at different times. If the receivers have synchronised sampling and the sampling rate is sufficiently high, the same signal will be present in all (or some) of the receivers, but delayed a number of samples depending on the distance between emitter and that particular receiver.

The wavelet transformed signal exhibits certain characteristics when delayed a number of samples, the characteristics depending on the delay. Thereby it is possible to determine the difference in time-of-flight (TOF) for the signal to each receiver, and it is a matter of geometrical or neural network means to determine the position of the emitter.

The auto correlation of the RS signal are small except for the zero shift, so by correlating the received RS signal with itself (or a "clean" version of it) the zero shift correlation will be significantly larger than other shifts, thereby showing the delay of the received signal.

The two different principles apply primarily to acoustic signals, since the TOF is quite large (and therefore easier to determine by sampling) for sound compared to electromagnetic signals, which travel at the speed of light. Unfortunately, sound signals tend to be reflected well by the surroundings, and a number of echoes are expected to be received as well. However, no echo will be received by a receiver before the "direct path" signal has been received. Combined with the fact that the echoes are most unlikely to be as intensive as the "direct path" signal, it is possible to ignore/remove the echoes in the received signal.

By determining the position of more than one emitter, it is possible also to determine the orientation of an object, under the condition that the distances of the emitters are fixed with respect to each other. By determining position over time, it is possible to determine motion of an object.

The method may further comprise the steps of
inserting a time delay before the step of emitting the first output signal,
determining the contribution of the received input signal from other sources than the first output signal,
reducing said contribution of the received output signal.

In this case the step of determining the contribution of the received input signal from other sources than the first output signal is performed by correlation between the predetermined original first signal and the transformed first input signal.

The contribution from other sources than the first output signal may be originating from cross talk between electrical conductors on a printed circuit board, but it may attentively be originating from other sources, such as the reflection of the signal upon walls or other objects present in the room, and/or other non-relevant emitters, and/or radioactive sources, including the background radiation, and/or noise originating from emitters and/or receivers and/or any other suitable noise source.

The method may further comprise the step of obtaining information regarding the temperature of one or more parts of an object. The object may in this case be an object to be welded and the region being in the vicinity of the welding seam. This way it is possible to obtain information relating to the temperature of both sides of the welding seam, the arc and the melted material on the welded object. In this embodiment semiconductors are preferably employed, the semiconductors being sensible to electromagnetic radiation at wavelengths being characteristic for the current combination of material and temperature interval.

The energy, which heats the plasma and the air surrounding the arc as well as the material in the vicinity of the welding seam, originates from the applied current, which immediately heats the area in the vicinity of the arc, the heat being gradually transmitted to the melted material from there.

In order to separate the electromagnetic radiation originating from the two areas, the applied current is modulated by a suitable high frequent signal, which may preferably be generated using the wavelet transform. The part of the electromagnetic radiation received by the sensor which comprises a component of the emitted signal is presumed to originate from areas in the immediate vicinity of the arc, whereas the remaining part in particular will originate from the melted material If orthogonal signals are used mathematical characteristics of, e.g., the wavelet transform may be employed for removing noise and robustifying the separation of the two temperatures which it is desirable to determine.

The present invention further relates to a method for transmitting signals, the method comprising the steps of
selecting an output signal from a predetermined set of output signals,
emitting the selected output signal by means of the emitter,
receiving an input signal by means of a receiver,
determining a transformed input signal by transforming said input signal by means of a predetermined linear transform,
comparing the transformed input signal with a predetermined set of original signals, each of said original signals being equal to one of said output signals of the predetermined set of output signals being emitted and received noiselessly with a known channel gain and being transformed by means of said linear transform, and
identifying the selected first output signal from said comparison.

This embodiment of the present invention is particularly useful when the emitter is movable, e.g. a remote control for an audio and/or video system or for any other suitable kind of system. The predetermined set of output signals may in this case represent a number of different actions, such as "play", "stop", "repeat", "volume up/down" etc., and emitting an output signal thus corresponds to sending a command to the audio/video system to perform the c6responding action. In a particular embodiment a receiver may additionally be comprised in the movable device, and an emitter may be positioned in the immediate vicinity of the receiver, so as to allow for two-way communication. In this case the system may return to the movable device a message regarding the reception of the command.

The present invention further relates to a pointing device for a computer comprising

- emitter means for emitting one or more output signal(s), the signal(s) being deterministic and containing an interval of frequencies,
- receiving means for receiving one or more input'signal(s),
- first determining means for determining one or more transformed input signal(s), the first determining means comprising means for transforming said input signal(s) by means of a predetermined linear transform,
- second determining means for determining one or more channel gain(s), the second determining means comprising means for comparison of said transformed input signal(s) and one or more predetermined original signal(s) each being equal to one of said output signal(s) being emitted and received noiselessly with a known channel gain and being transformed by means of said linear transform,
- converting means for converting the determined channel gain(s) into a three dimensional position of an object, and for converting said three dimensional position into a position of the pointing device.

The object may be at least part of a human being, preferably the hand or the finger of the user of the pointing device as described above.

The pointing device may further comprise data communication means for communication between the pointing device and an external computer device. The data communication means may be wireless, or it may comprise one or more chords connecting the pointing device and the external computer device. The pointing device may alternatively constitute a part of the computer device.

The invention will now be further described by way of examples.

DETAILED DESCRIPTION OF THE PREFERRED EMBODIMENT

EXAMPLE 1

Figure 1:
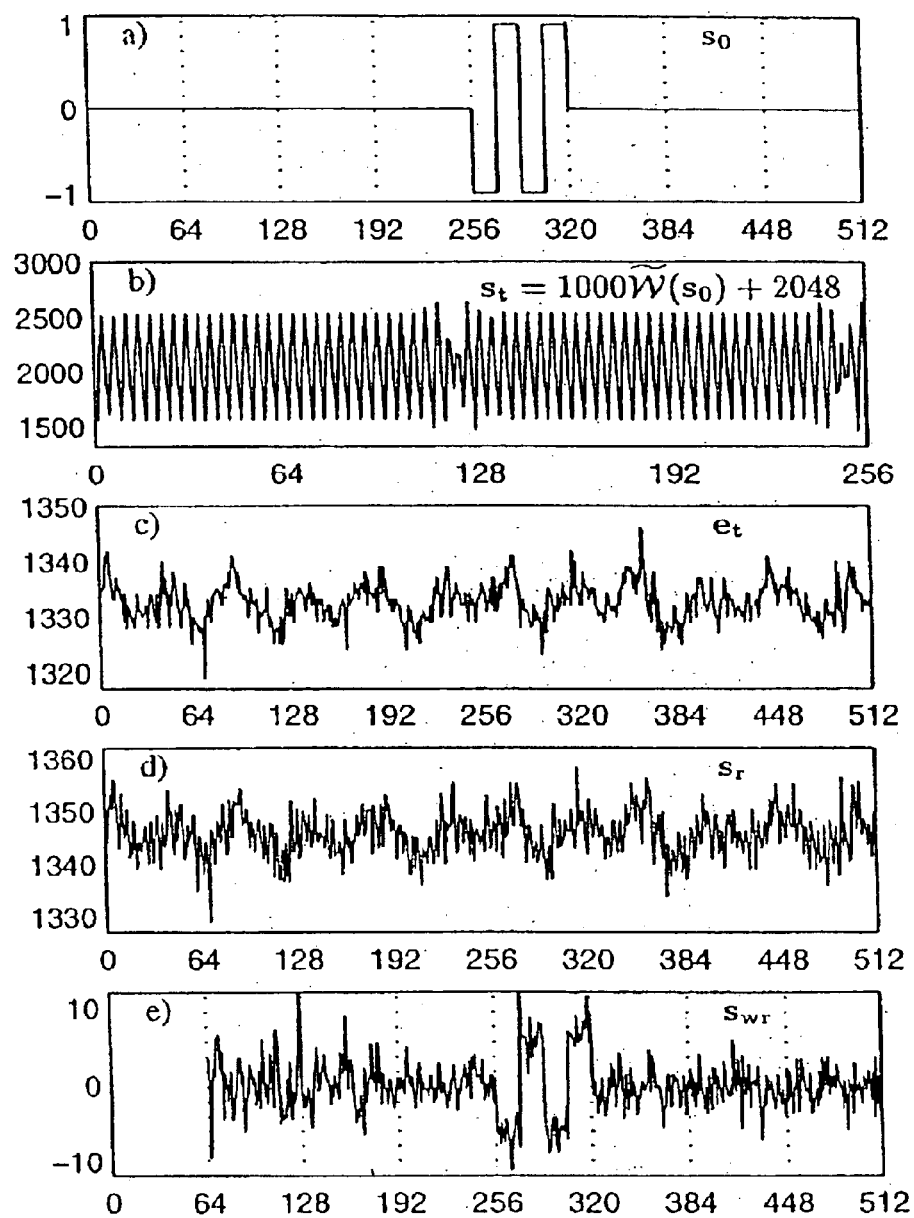
FIG. 1a shows the original signal.
FIG. 1b shows the emitted signal.
FIG. 1c shows the transmission noise.
FIG. 1d shows the received signal.
FIG. 1e shows the received signal wavelet transformed.

A Fast and Robust Wavelet Transform Based Algorithm for Estimating Channel Gain

The measurement of channel gains is a widely used method for determining properties of substances. A common way of performing this measurement is by sending a harmonic signal with known amplitude through the substance followed by a filtering of the received signal, which yields an estimation of the channel gain, and hence a quantification of an unknown substance property. These types of signals are unfortunately sensitive to various kinds of noise, making robust implementations difficult. The wavelet transform, being fast and highly adaptable, is proposed as a tool for making these estimations robust. This Example demonstrates that by combining a series of carefully designed signals and the versatility of the wavelet transform, it is possible, with low computational complexity, to make robust estimations of channel gains.

Introduction

One of the ways of determining the density, transparency or thickness of a substance or material, such as smoke, wine, glass, paper, plastic is channel gain measurements; by transmitting a signal with a known intensity through the substance or material, and estimating the resulting intensity, it is possible to determine the density, transparency or thickness. Channel gain measurements are also used for ascertaining the surface properties of, distance to, or mere presence of objects. In this case an emitted signal is reflected onto a receiver. An example is a system for automatically opening a door whenever a person is present in front of it.

The Previous Solutions

A typical way of making this type of measurements is emitting a simple signal, such as a harmonic signal, since this is easily constructed with analog electronics. Moreover the intensity of a harmonic signal is found by a plain band pass filtering. Alternatively a non-structured signal, like radiation or light with constant intensity, can be emitted. The estimation of the received intensity is in this case particularly simple. However, the use of simple signals makes the channel gain measurement sensitive to the environment, since most electrical apparatuses found in industry and at home emits (often unintentionally) all kinds of simple signals, both visually and audibly. For instance a remote control produces as series of infra red signal, while television set emits a rather intense, high frequent sound. For every new application that utilises channel gain measurements in this fashion it is therefore necessary with a great deal of testing and fine-tuning. A necessity which is both costly and time consuming.

The Proposed Solution

Since the simplicity of the signals is the Achilles' heel with respect to robustness of the estimations of the channel gain, a logical approach is to introduce more complex signals. That is signals carefully designed such that they are easily recognised even when overlaid with severe noise. Adaptive design of complex signals is most easily done digitally, and the proposed solution therefore assumes the possibility of digital signal processing. The key question then becomes what signal is best suited for transmission under the given conditions, including the overlaid noise, the characteristics of the electrical components, the properties of the transparent or reflecting material, and the capacity of the: signal processor. The noise is a priori unknown, although in many applications some types of noise are likely to occur. Due to the low cost of the electrical components the characteristics of these can vary quite a lot, even for two seemingly identical components. The low cost priority also result in a fairly low signal processor capacity. The large uncertainty on some of the main factors makes it virtually impossible to design "the best" signal. For not only should the signal be immune to many types of noise, it is also subject to a trade off between recognisability.(which often implies complexity), robustness, and processor capacity.

The proposed solution is to first design a signal with certain properties, and then, prior to transmission, "protect" it by altering the time-frequency content via an inverse wavelet transform. The received signal is forward transformed resulting in the original signal overlaid with noise. Since the wavelet transform can produce predefined trade offs between time and frequency information, and since the design of the original signal is completely free, this method can be adapted to virtually any type of noise. Because the transform is linear, is energy preserving, and has perfect reconstruction, and because the original signal is known, it is easy to determine a number of properties of the current overlaid noise. This information can be used for automated, online adaptation. Good introductions to the wavelet theory are Wickerhauser 1994 and Vetterli et al. 1995. A rigorous, mathematical treatment of the subject is given in Daubechies 1992.

The Idea

A digital signal $s_0$ is generated, processed and transmitted from emitter to receiver. The results is another signal $s_r$, which is also processed to determine the intensity of transmitted signal, and hence the channel gain. The wavelet transform included in the processing is the discrete wavelet packet transform. The result of transforming, denoted by $W(.)$, is the representation of the signals in some basis, and the inverse transform, denoted $\tilde{W}(.)$, is the reconstruction of the signal from whatever basis it is represented in. The starting point is the signal $s_0$, the structure of which eventually will determine the quality of the measurement, and from this the signal to be transmitted $s_t$ is constructed by an inverse wavelet transform (from whatever basis the signal $s_0$ is represented in) followed by an affine mapping to adjust it to the range of the emitter.

$$s_t = \alpha \tilde{W}(s_0) + \beta 1$$

The transmission signal is given by $s_r = T(s_t)$, where T is the transfer function from emitter to receiver, including the characteristics of both components. T is assumed to be a constant transfer function, but the approach can easily be extended to handling dynamical ones as well. Assume that the transmission dampens the signal and adds noise, that is $T(x) = Gx + e_t$, then the wavelet transform of the received signal becomes $$W(s_r) = W(G(\alpha \tilde{W}(s_0) + \beta 1) + e_t)$$
$$= G(\alpha s_0 + \beta W(1)) + W(e_t),$$

where G is the channel gain. Since $\alpha$ and $\beta$ are known this reduces to $$s_{wr} = G s_n + e_{wr}, \quad (1)$$

where both $s_r$ (hence also $s_{wr}$) and $s_n$ are known signals. Note that the subscript W indicates a wavelet transformed signal. This equation has three major degrees of freedom, the choice of original signal the choice of wavelet transform, and the choice of solution method. The goal is a good estimation of the channel gain G, and by exploiting all three degrees of freedom this is possible even for severe noise conditions.

The Wavelet Transform

The wavelet transform has two purposes in this framework: Producing the emitted signal and transforming the noise contribution. The former is determinant for the energy consumption of the emitter, and for the emitters influence on the surroundings, while the latter has direct influence on the quality of the estimation of G. In this example we will be concerned solely with the quality of the estimation.

The wavelet transform itself has a number of degrees of freedom which can be exploited in the adaptation. Apart from the obvious choice of filter and choice of basis, the transform type is important; an integer-to-integer transform (Calderbank et al. 1998) might be attractive since the signals are digital (this would eliminate the quantisation errors), the lifting technique (Daubechies et al. 1998 and Sweldens 1997) could prove superior in adapting the transform to signal and/or noise, while a transform on finite fields (Fekri et al. 1999) perhaps is the best solution to the dynamic range problem occurring in fixed point arithmetic. Another transform property is the handling of the ends of the signal. This is important since W is a wavelet packet transform, which by repeated transformations yields several elements, each with two ends. The "ends" problem is traditionally dealt with either by periodisation or by mirroring. Alternatively boundary filters (Herley et al. 1993) or time-varying transform (Herley et al. 1994) could be used to reduce undesired effects occurring at the ends.

The choice of filter is usually restricted to orthogonal filters, since non-orthogonal filters tend to have asymmetric frequency responses rendering the result of repeated transforms inhomogeneous with respect to gain in the various frequency bands. This property might be useful for suppressing noise however, but this has, to the best of the authors' knowledge, not yet been investigated.

Solving The Equation

The vector equation (1) can be considered as a system of n linear equations with n+1 unknowns; some or all of the entries of the noise vector, and the gain. The size n of the system depends only on the number of non-vanishing coefficients in the original signal and the chosen basis representation (through W1)), and the coefficients on G is directly controllable via $s_0$. This means that the linear equation system can be tailored to fit an approximate solution method such as least square. If the noise is normal distributed, $e_t \sim N(\mu, \sigma^2)$, this will give the best result, independently of the wavelet transform. Inverse transforming (1) yields $$s_r = G s_t + e_t. \quad (2)$$

Note that $s_t$ can be any signal, and $s_r$ is the result of the transmission. A least square approach could be formulated through a rewriting of (2) to $$\|s_r - G s_t - \mu 1\|^2 = \sigma^2 N, \quad (3)$$

where N is the length of the signal. Let o be the smallest value for which (3) holds. Then (3) is an elliptic paraboloid with minimum in the $(G,\mu)$ plane. This minimum point is found when the G and $\mu$ discriminants are zero simultaneously. Solving that yields $$G = \frac{\langle s_r, s_t \rangle - \mu \langle s_t, 1 \rangle}{\|s_t\|^2} \quad (4)$$

with $$\mu = \frac{\langle s_r, s_t \rangle \langle s_t, 1 \rangle + \|s_t\|^2 \langle s_t, 1 \rangle}{\langle s_t, 1 \rangle^2 - N \|s_t\|^2}. \quad (5)$$

The smallest $\sigma$ is then $$\sigma^2 = \frac{\mu^2 \langle s_t, 1 \rangle^2 - \langle s_r s_t \rangle^2 + \|s_t\|^2 \|s_r\|^2}{\|s_t\|^2 N} - \mu^2 \quad (6)$$

As long as the noise is normally distributed these estimations are fairly accurate. Unfortunately there is no way of immediately telling how accurate the estimation of G is.

Another way is to exploit two properties of the linear equations, namely that G is present in ad of them and that the noise, although unknown sample by sample, has some approximately known properties (mean, energy, frequency distribution etc.). With the wavelet transform it is then possible to make the G estimation more robust than in the previous solution; having the freedom in choice of original signal, another possibility is to design the original signal such that $\langle e_{wt}, s_0 \rangle$ is close to zero. Then $$G = \frac{\langle s_{wt}, s_0 \rangle}{\langle s_n, s_0 \rangle} - \frac{\langle e_{wt}, s_0 \rangle}{\langle s_n, s_0 \rangle} \approx \frac{\langle s_{wt}, s_0 \rangle}{\langle s_n, s_0 \rangle}. \quad (7)$$

If certain frequency bands in the noise are "nice", i.e. has low mean square error or contains nearly white noise the wavelet transform can target these intervals making a easy to design a signal $s_0$ which has high probability of $\langle e_{wt}, s_0 \rangle$ being close to zero.

Vernfication of Measurements

The special structure of the system allows for solutions involving only easily calculated quantities, like the inner products. Such a simple approach, however, is sensitive to time localised noise, spikes in particular. To reveal occurrences of this type of noise the freedom in design of the original signal comes in handy. Let $s_0$ through $S_k$ be K+1 signals with the properties $$\langle s_k, s_m \rangle = 0 \text{ for } k \neq m \text{ and } \langle s_k, e_{wt} \rangle \approx 0,$$

where $e_t$ is a typical noise occurrences. When transmitting $s_m$ the other K signals, called verifiers, can be used to indicate the quality of an estimation on the form (7). A time localised noise occurrence is still time localised in a wavelet transform, and $\langle s_{wt}, s_m \rangle$ could in such a case very well be a poor estimate of the gain. The inner products $\langle s_{wt}, s_k \rangle$ for $k \neq m$ would be similarly affected by the noise, independently of the channel gain. Comparing $\langle s_{wt}, s_m \rangle$ to each of the verifiers inner product with $s_{wt}$ gives a quality of the estimation of G. A comparison could be done like $$p = 1 - \exp\left( \frac{-BK \langle s_{wt}, s_m \rangle^2}{\sum_{k=0, k \neq m}^{K} \langle s_{wt}, s_k \rangle^2} \right), \quad (8)$$

where the exp is introduced to make the quality of the estimation absolute, that is $0 \leq p \leq 1$. Whenever the verifiers detect energy in the received signal (energy which then have to originate in noise), p becomes small. The higher the ratio of estimated gain and verifier energy, the closer p gets to 1, with B controlling how close. When some parts of the received signal is corrupted by noise, there might still be other usable parts. Then (7) and (8) can be restricted to these parts to give a G estimate unaffected by the corrupting noise.

Results

FIG. 1 shows experimental data from an infra red emitter-receiver implementation. FIG. 1a shows the original signal, FIG. 1b shows the emitted signal, FIG. 1c shows the transmission noise (i.e. the experimental data), FIG. 1d shows the received signal, and FIG. 1e shows the received signal wavelet transformed.

A number of suggestions on how to utilise the wavelet transform to measure channel gain has been given in the previous section. The result of using a few of them in an infra red emitter-receiver implementation is presented in this section. In all cases the result of wavelet transforming with W is the fourth level in a wavelet packet transform decomposition. This level consists of eight elements, as indicated in the figures. The filter is Symlet,8 (Daubechies 1993), and due to the short filter periodisation is used. The noise is recorded with the infra red photodiode at 5 kHz, and the noise vector $e_t$ is shown in FIG. 1c. As original signal a step function is chosen, FIG. 1a, and the function $x \rightarrow 1000x + 2048$ is chosen as affine mapping. This mapping applied to so is shown in FIG. 1b, which is then the emitted signal. The gain is known to be 0.00642. The received signal in shown in FIG. 1d, and the transform of this is shown in FIG. 1e.

TABLE 1

| Description | FIG. | $\Delta_{rel}G$ | $\Delta_{rel}\mu$ | $\Delta_{rel}\sigma^2$ |
|---|---|---|---|---|
| No extra disturbance | 1d | 1.1% | 0.01% | 1% |
| Added 200 to sample 117 | | 24.6% | 0.29% | 171% |

Table 1 shows results of applying the least squares methods (4)–(6). The three percentage columns show the deviation between the estimated and the real values.

Applying the least square approach (4)–(6) to the transmitted signal $s_t$, see FIG. 1b, and received signal, see FIG. 1d, gives a gain and mean which deviates only very little from the true values (see Table 1). However, the addition of a single spike in the received signal (in this case 200 is added to sample 177) makes the estimation of G rather poor, and there is no immediate way of detecting this.

TABLE 2

| Description | FIG. | $\Delta_{rel}G$ | $\Phi_0$ | $\Phi_1$ | $\Phi_2$ | $\rho$ |
|---|---|---|---|---|---|---|
| No extra disturbance | 1e | 1.1% | 416 | 2 | 29 | 99% |
| Spike at sample 177 | 2c | 25% | 512 | 112 | 149 | 16% |
| Interval [257; 288] | 2c | 47% | 302 | 125 | 124 | 6% |
| Interval [289; 320] | 2c | 2.4% | 210 | 13 | 19 | 85% |
| Interval [257; 272] | 2c | 2.7% | 106 | 7 | 12 | 74% |
| Interval [273; 288] | 2c | 90% | 196 | 118 | 112 | 3% |
| 1st recursion, 1st method | | 7.7% | 442 | 42 | 73 | 46% |

TABLE 2-continued

| Description | FIG. | $\Delta_{rel}G$ | $\phi_0$ | $\phi_1$ | $\phi_2$ | $\rho$ |
|---|---|---|---|---|---|---|
| 2nd recursion, 1st method | | 1.5% | 405 | 4 | 35 | 94% |
| 1st recursion, 2nd method | | 5.8% | 435 | 21 | 52 | 75% |
| 2nd recursion, 2nd method | 2d | 3.4% | 425 | 9 | 40 | 91% |

Table 2 shows the results of applying the solution method (7). The third column shows the deviation between the estimate and real value of G. Column four through six show the inner products $\phi_k=\langle s_k, s_{wr}\rangle$, and the last column the corresponding quality measure (8).

Figure 2:
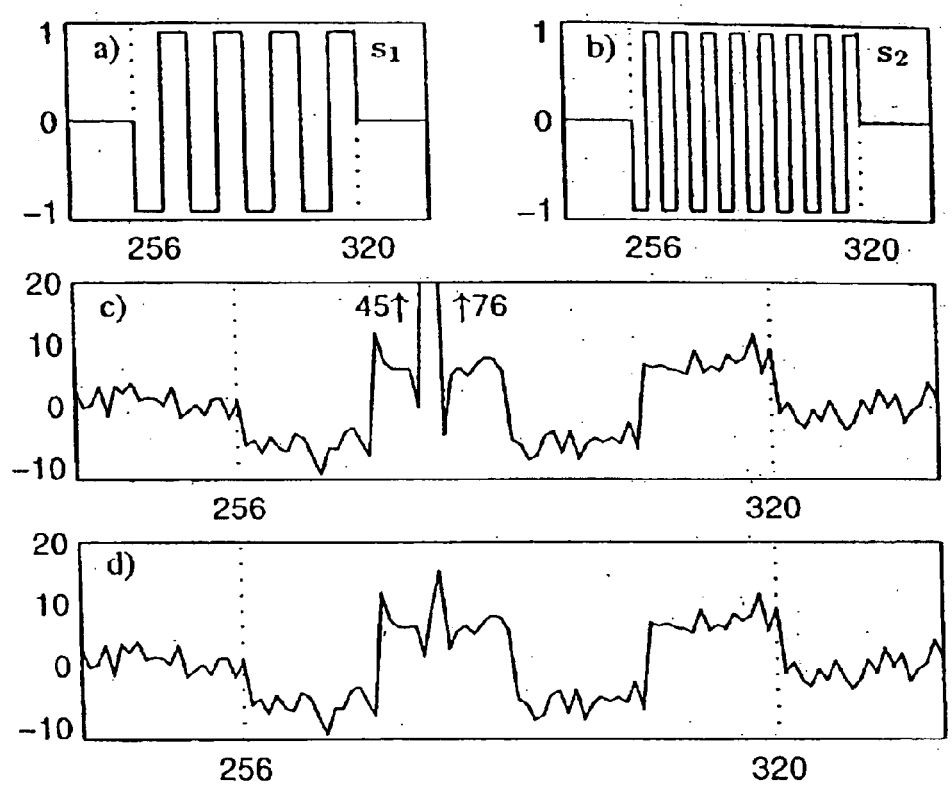
FIG. 2a shows the first verifier.
FIG. 2b shows the second verifier.
FIG. 2c shows the received (spiked) signal wavelet transformed.
FIG. 2d shows the results of two recursions of 2nd method of spike reduction.

In FIG. 2, FIG. 2a shows the first verifier, FIG. 2b shows the second verifier, FIG. 2c shows the received (spiked) signal wavelet transformed (the spike in the transformed signal consists of two large values 45 and 76), and FIG. 2d shows the results of two recursions of 2nd method of spike reduction.

The detection of a poor estimate is possible with the inner product approach (7). First, applying it to the wavelet transform of the received signal (FIG. 1e) yields a good estimation of G (see Table 2). To determine the quality of the estimation two verifiers, si and $s_2$ in FIGS. 2a and 2b, are used. They have the same structure as $s_0$ while at the same time being orthogonal to $s_0$. The absolute quality measure p in (8) also shows a good estimation (B is chosen such that $p=1-\exp(-B\cdot 200)=0.9$). When applied to the transform of the spiked, received signal (the same spike as before), the estimation is poor, which is easy to tell from the p value. If the noise causing this poor estimate is localised in time (which the spike is) parts of the received signal can still be used for achieving a good estimate. Applying (7) and (8) to each half of the interval [257;320], the p values reveal that the spike occurred in the first half of the received signal. At the same time a good estimation of G becomes available. Dividing the first half shows that the spike occurred in the second quarter of the received signal. This approach works equally well if the entire second quarter of the received signal has been corrupted.

If a number of spikes occur distributed along the entire received signal, the above method might fail. In this case a spike reduction method is useful. The estimated value of G (which for this spike example is off by 25%) indicates approximately the expected amplitude of the original signal in the transformed, received signal (via $Gs_n$). Any coefficients larger than this amplitude is most likely noise. The largest coefficient is then set to the expected value, which depends on the original signal, the so far estimated G, and the coefficient's place in time. The result of this approach is shown in Table 2 (referred to as 1st method). When this large value is "neutralised", a better G can be estimated, and the next recursion "neutralises" the second largest value (there are two large values in the spike in FIG. 2c). Alternatively the alteration of the received signal can be done by a similar procedure before it is transformed. Instead of reducing one coefficient at the time, this reduced all "too large" coefficients simultaneously. The effect of one and two recursions are shown in Table 2 as 2nd method, and the graphical result in FIG. 2d.

Conclusion

The use of the wavelet transform for estimating channel gains is shown to be robust with respect to different types of noise. The versatility of the transform, including the choices of filters, bases, implementations etc., and the freedom in choice of original signal and verifiers makes the method highly adaptable. One particular use of the methods was presented through a infra red emitter-receiver example, but many other exploitations are possible. The low complexity and numerical stability of the discrete wavelet transform and the solution methods (mainly inner products) also makes this approach fast and suitable for low cost hardware implementation.

EXAMPLE 2

Fast and Robust Measurement of Optical Channel Gain

We present a numerically stable and computational simple method for fast and robust measurement of optical channel gain. By transmitting adaptively designed signals through the channel, good accuracy is possible even in severe noise conditions.

Introduction

The measuring of optical channel gains is a key element in many applications. Measuring channel gains means determining the change in intensity when a signal is transmitted from an emitter to a receiver. A well-known and simple application is an automatic door, which responds whenever a person is reflecting the emitted signal, and thereby significantly increasing the channel gain. Another example is measuring the thickness of paper. A more subtle example is determination of spatial position by comparing the intensities of a multitude of reflections from a single object A typical way of making this type of measurements is emitting a simple signal, such as a harmonic or square wave signal, since they are both easily constructed and measured with analog electronics. Such solutions have two major disadvantages: The signals are sensitive to frequency located disturbances, and it is difficult to detect and avoid /neutralise such disturbances.

We propose a measuring method which is highly accurate in moderate noise conditions, and less accurate, but very robust, in severe noise conditions. This is achieved by using two closely related digital signal design algorithms; a "best case" and a "worst case" algorithm. The former is based on the wavelet transform (WT), while the latter is based on the Rudin-Shapiro transform (RST). They are both simple, numerically stable, and post-processing friendly making them ideal for implementation e.g. in a fixed point DSP. By introducing a signal processor it becomes possible to continuously redesign the signals for improved SNR, and thereby maintaining the accuracy in changing and/or severe noise conditions.

Designing the Digital Signals

The two design algorithms are based on the wavelet packet transform scheme; it is fast, numerically stable, works well in fixed point arithmetics, and has low program complexity. The best case algorithm uses the classical WT to create signals which are near-orthogonal to expected noise occurrences, while the other algorithm uses the RST to create an all spectrum signal, which by nature has low sensitivity with respect to time and frequency located noise occurrences. The difference is essentially that the WT algorithm "searches for holes" in the current noise, while the RST algorithm spreads information in time and frequency to reduce the impact of localised disturbances. The preferred method depends on the-noise conditions. If there are easy-to-find holes in the noise, the former can provide very accurate measurements. If, however, the noise is difficult to define or is changing rapidly, the latter method provides lesser accurate, but more robust measurements.

A good introduction to the wavelet theory is (Wickerhauser 1994). A mathematically rigorous treatment of the subject is given in (Daubechies 1992). For more material on Rudin-Shapiro polynomials see (Brillhart 1973).

The Wavelet Transform

Figure 3:
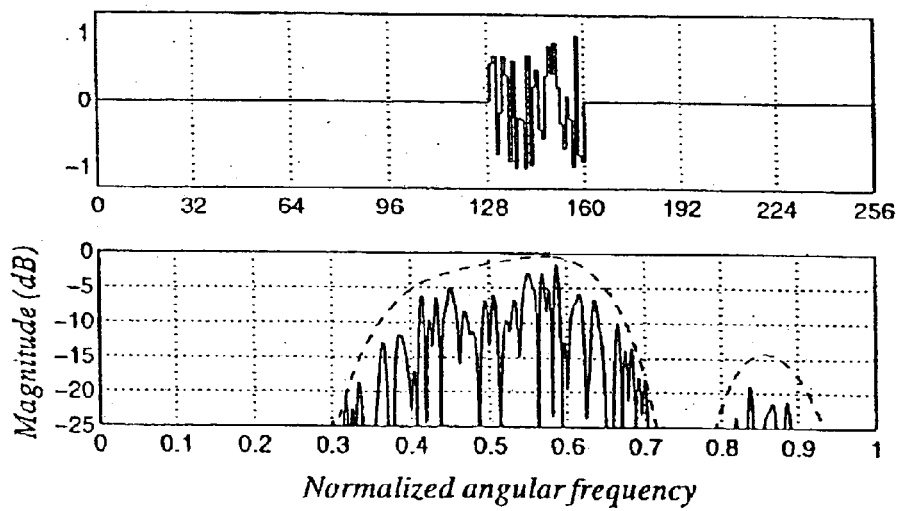
FIG. 3 shows the wavelet transform.

The upper part of FIG. 3 shows a simple signal (here a sampled chirp). Below (in solid) is shown the absolute value of the Fourier transform of the 3-scale inverse wavelet packet transform with symlets 6 (Daubechies 1993). The dashed curve shows the maximal frequency spreading for any (suitably normalised) signal with coefficients vanishing outside the interval [128;159].

The WT based algorithm takes a simple, time localised signal (see FIG. 3 for an example), and inversely wavelet packet transform it, which results in a frequency localised signal. A typical maximum spread is also shown in FIG. 3. After transmission the signal is forwardly transformed to reproduce the original, now noisy simple signal, and by inner product with the "clean" original signal the transmission intensity (the channel gain) is determined. Since the original signal is completely known, it is also possible to obtain an estimated accuracy of the channel gain measurement This is accomplished by taking inner product between the transmitted, transformed signal and a number of signals orthogonal to the original signal. If these quantities are small the transmission was most likely'subject to only mild noise. This trick provides an easily calculated guideline to how much one can trust the current measurement. If each measurement is vital a number of signal restoration procedures (not further described here) can be applied. These also benefit from the complete knowledge of the original signal. Note that the small number of non-vanishing coefficients of the original signal in all cases significantly reduce the amount of calculations.

Because the transform is linear and has perfect reconstruction, it is also easy to make a good sample by sample estimation of the noise which provides valuable information on any disturbances. This makes it possible to do real time adaptation of the signal. The methods combines the ability of the WT to produce predefined trade-offs between time and frequency information with the freedom in design of the original signal. Thereby it is possible to adapt the method to virtually any type of noise, in particular disturbances with large temporal extent.

Typically low frequent disturbances cause slow decay of the outermost coefficients in all bands when transforming finite signals with methods that introduce discontinuities in the signal or its derivative (for instance periodising and mirroring) It is possible to'significantly reduce this effect by designing edge filters which preserves the polynomial regenerating property of the wavelet transform. This will increase the accuracy of the measurements, especially when the number of coefficients are small.

The Rudin-Shapiro Transform

Figure 4:
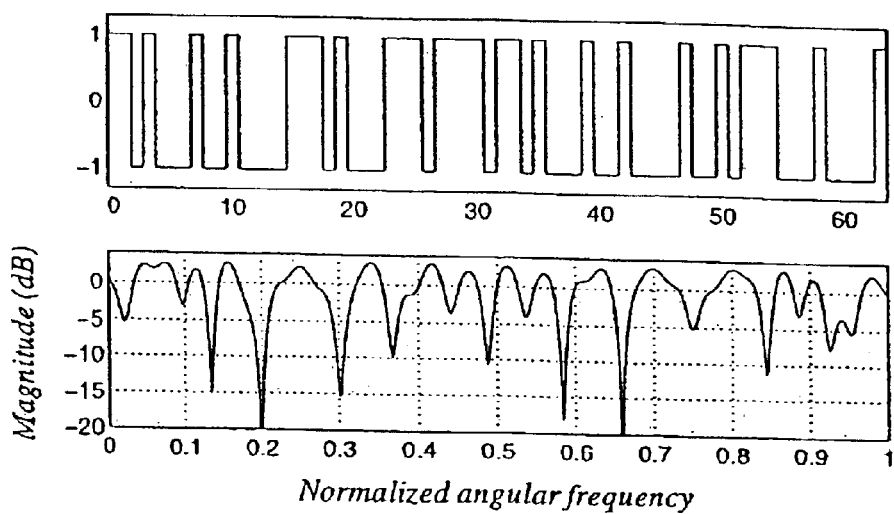
FIG. 4 shows the result of applying the inverse Rudin-Shapiro transform.

The upper part of FIG. 4 shows the result of applying the inverse Rudin-Shapiro transform to the 29th canonical basis vector of length 64. Below is shown the frequency response (the absolute value of the corresponding $P_6(e^{i\xi})$) polynomial).

The RST is defined through a slightly extended version of the remarkable Rudin-Shapiro polynomials, introduced in 1951 by H. S. Shapiro in his master's thesis, and published in 1959 by Rudin (Rudin 1959). Define the polynomials $$P_{m+1}(z) = p_m(z) + (-1)^{\delta} = z^{2^m} Q_m(z), P_0 = 1$$

$$Q_{m+1}(z) = p_m(z) - (-1)^{\delta_{is}} = z^{2^m} Q_m(z), Q_0 = 1 \quad (9)$$

with $\delta_m \in \{0,1\}$. It immediate follows that for all $|z|=1$ $$|P_{m+1}|^2 + |Q_{m+1}|^2 = 2|P_m|^2 - 2|Q_m|^2 = 2^{m+2}$$

Consequently, $$max|P_m(e^1)| \leq \sqrt{2} \|P_m(e)\|^2, \quad (10)$$

guaranteeing a certain flatness of the polynomials. A construction similar to (9) is found in (Bymes 1994). The coefficients of the polynomials can also be constructed with the Rudin-Shapiro transform, which is really a modified wavelet packet Haar transform.

Define the unitary transform $H_n: \Re^{2^n} \to \Re^{2^n}$, $n \geq 1$, as $$\begin{bmatrix} y_k \\ y_{k+2^{n-1}} \end{bmatrix} = \frac{1}{\sqrt{2}} \begin{bmatrix} 1 & (-1)^k \\ 1 & -(-1)^k \end{bmatrix} \begin{bmatrix} x_{2k} \\ x_{2k+1} \end{bmatrix}$$

for $k=0,\ldots,2^{n-1}-1$ when mapping x to y. Then, with $\overline{H}_n$ being the inverse of $H_n$, $$\overline{H} \equiv \prod_{N=1}^{N} \begin{bmatrix} \overline{H}_n & & 0 \\ & \ddots & \\ 0 & & \overline{H}_n \end{bmatrix}_{2^N \times 2^N}$$

transforms the canonical basis for $\Re^{2^k}$ into the coefficients of the $2^N$ possible $P_N(z)$'s. Hence these coefficients constitutes an orthonormal basis, which not only consists of only ±1, but also, due to (10), has a remarkable frequency response. In FIG. 2 is an example of such a basis element and its frequency response.

The RST based algorithm is applied in much the same way as the WT method. A simple signal is inversely transformed prior to transmission. This will produce an all-spectrum signal. Upon transmission the signal is forwardly transformed yielding the original, simple signal with noise. The post-processing is equivalent to that of the WT method.

Conclusion

Two computationally simple and numerically robust algorithms for measuring optical channel gains were presented. One of the algorithms provides excellent accuracy in moderate noise conditions., while the other has reduced but very robust, accuracy even in severe noise conditions. Combining the two algorithms, either by applying the most suitable one, or jointly in two parallel systems, is easy due to their similar program and computational structure, and the result is a versatile optical channel gain method. The low complexity and numerical stability of the wavelet packet transform scheme and of the post-processing (mainly inner products) also makes this approach fast and suitable for low cost hardware implementation.

EXAMPLE 3

Description of 3D Mouse—"Dragonmouse"

The 3D mouse is a product that determines the three dimensional position and/or motion and/or orientation of an object by emitting electromagnetic or acoustic signals which are reflected by an object onto signal receivers. The determination of the position (and/or motion and/or orientation) of the object is based on the knowledge of the emitted and received signals. This means that the object is passive with respect to the determination of its own state. By converting the position and/or the motion of the object into three dimensional coordinates, the 3D mouse works just like a conventional 2D mouse except that three coordinates (instead of two) are available to the application to which the 3D mouse is connected. By also converting the orientation of the object into two or three angles the 3D mouse can determine directional as well as rotational motion at the same time.

The 3D mouse consists basically of two components; the base which is an active component, and the reflector which is a passive component with respect to determining position, motion, rotation. The reflector can be any object, including a finger or a hand. The base is a box (see FIG. 5) in which the emitters and receivers are located. By emitting a particular and distinct pattern from each emitter it is possible to determine which part of a received signal (from any of the receivers) originates from which emitter. Thereby a number of simultaneous measurements are made. By comparing these measurements, unknown factors such as reflection characteristics of the object, noise, changes in hardware due to ageing, dust and dirt, and wear and tear, can be eliminated, and thereby making it possible to determine the three dimensional position and/or motion and/or rotation of the object by appropriate algorithms (see FIG. 5).

The implementation of a button-like function in the 3D mouse can be accomplished either by a distinct motion of the object, or by an actual button on the base, on the keyboard or in the reflecting object. In the latter case the result of pushing the button is a change in the state of the reflecting object indicating to the base that a button has been pushed.

The patterns in the emitted signals and the processing of the received signals are handled by a signal processor located inside the 3D mouse base.

Figure 5:
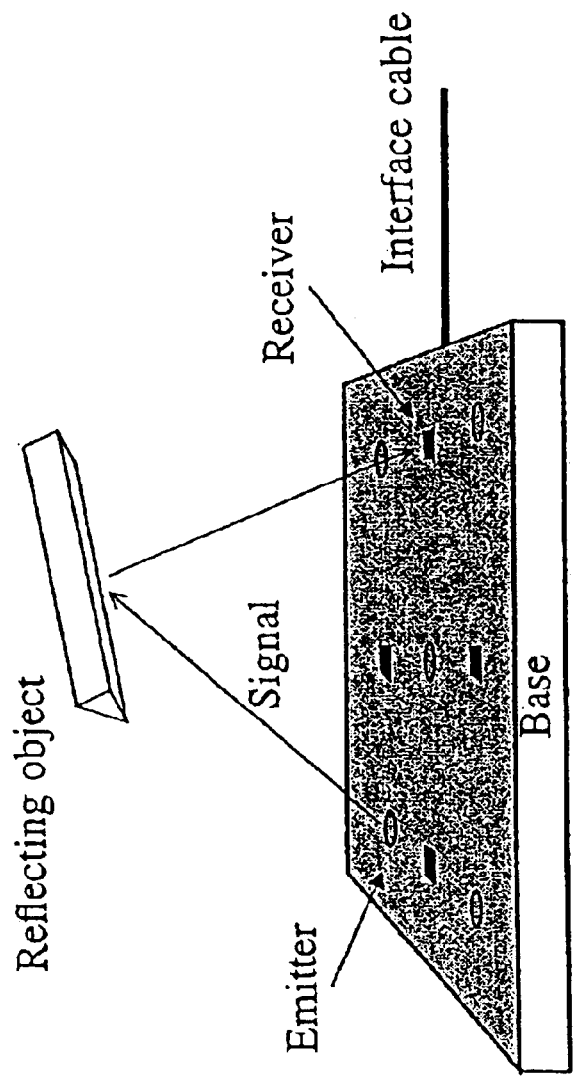
FIG. 5 shows the method for determining the channel gain between emitters and receivers.

FIG. 5 shows the principle idea of the 3D mouse. The reflecting object is exemplified by a bar.

The 3D mouse can also operate in 2D mode, in which the base and the object typically will be in contact.

The Algorithm

Figure 6:
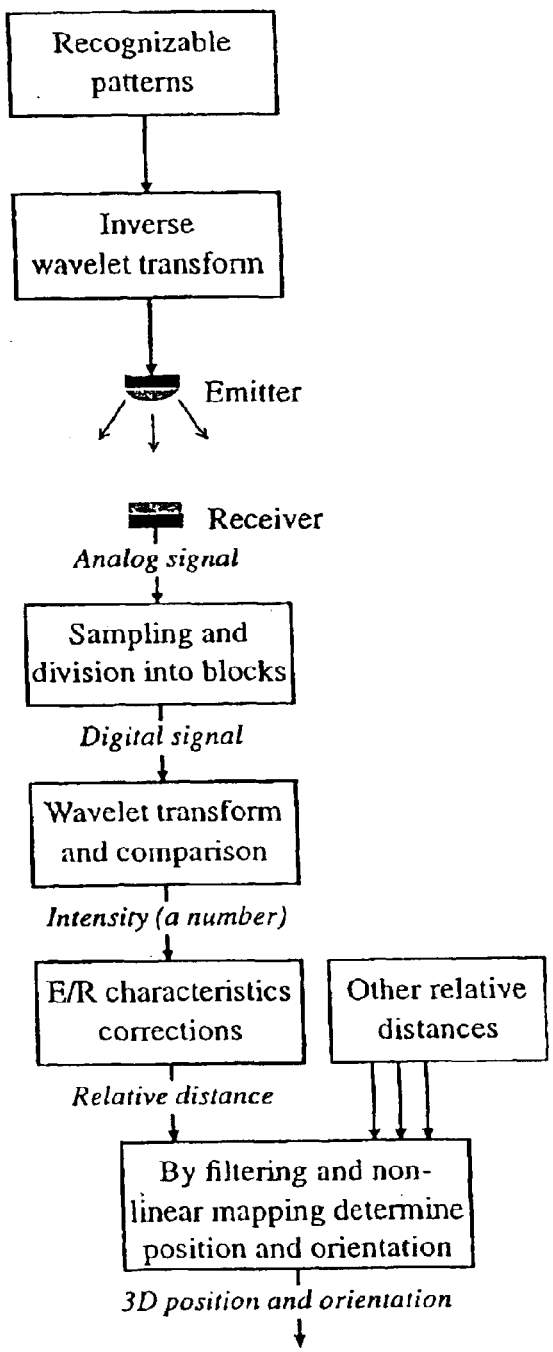
FIG. 6 shows a flow diagram of the algorithm.

The purpose of the algorithm is to convert the signals received by the receivers into a 3D position and orientation. A number of appropriate, digital signals (patterns) are available to the algorithm. These are inverse wavelet transformed and emitted. Based on the knowledge of the emitted signal the received signal is sampled and divided into blocks of certain lengths. The resulting signal is wavelet transformed and compared to the original pattern to determine how large a fraction of the received intensity originates from the emitter. This produces one number. For an ideal emitter and receiver (E/R) pair this number is a relative distance (relative to the intensities measured by other E/R pairs), but since these pairs often have characteristics deviating significantly from the ideal, a correction based on the E/R characteristic might be necessary. The relative distances determined by all the E/R pairs are combined by filtering and non-linear mappings to determine 3D position and orientation. FIG. 6 shows a flow diagram of the algorithm.

Alternate Geometries and Applications

Above a general principle for 2D or 3D positioning has been described.

The explicit layout is referred to above as a box. However, any three dimensional distribution of emitters and, receivers is possible and other configurations than those that might be contained in a box are relevant for several applications.

For instance, to determine the position of a physical pointer.(a hand, a pen or other objects suitable for pointing) in front of a monitor, such as a computer screen, the ideas described in this document can be applied. In this case, the emitters and receivers can be placed around the monitor (probably close to the screen surface plane). As the hand or pointing device points to the screen, intensities from reflections of the emitters via the pointing device to the receivers are measured. Based on these measurements, a 2D or 3D position is determined.

EXAMPLE 4

Infra Red 3D Computer Mouse

The infra red 3D mouse is a three dimensional input device to a computer. It works by determining the position of an arbitrary object (like a hand) by emitting infra red signals from a number of locations and measuring the reflected intensities. To maximise stabyility, robustness, and use of bandwidth, the signals are designed by means of the wavelet and the Rudin-Shapiro transforms. This also allows for easy separation of simultaneously made measurements. The measured intensities are converted to an 3D position by a neural net. The principle also applies to other applications, for instance a hand in front of monitor. We are currently constructing a prototype to test the potential of this idea.

Introduction

The possibility of fast, robust, and inexpensive determination of the three dimensional position of a passive object is an interesting challenge, both industrially and scientifically. In contrast to a system performing 3D positioning of active objects, (such systems are well-known and widely used; one of many examples is GPS), a system for positioning of passive objects usually has to rely on signals which are emitted in the direction of and reflected by the object rather than signals emitted by the object itself. The natural consequences of this is that there is a relatively large difference in the intensity of the emitted signal and the reflected, received signal. For the system to be both robust and efficient it is therefore vital to exploit its single, major advantage: The complete control and knowledge of the emitted signal.

To test a new idea for an inexpensive and robust 3D positioning system we are constructing an infra red 3D computer mouse. Many other positioning systems could be used as a test bench, but we have chosen the mouse because it is cheap and relatively easy to build, has suitable real time requirements, is of some commercial interest, and it has "laboratory-friendly" dimensions. The idea is to emit a whole range of signals from various position and measure the reflected intensities The relations between the intensities is then converted into a 3D position. The signals are infra red (IR) light, and the IR emitters and receivers are located in a box with dimensions equivalent to a thick ordinary mouse pad. An object, like a hand, can then be positioned when it is over the mouse pad.

The calculation of the 3D position of an object is divided into two consecutive steps. The first step is determining the relative distances by measuring the intensity of infra red light emitted in the direction of and reflected by the object. The second step is converting the high dimensional measurement data into a three dimensional position. We have developed and tested an accurate and robust method that carries out the first step. This is described in the next section, and constitutes the main part of this presentation. To perform the second step we propose to use a neural network, possibly with wavelets functions as neurons. The relative distances are highly non-linear, and preliminary simulations have indicated that a neural network with conventional functions might not suffice. The results so far are described below.

Measuring the Relative Distances

The first step of the determination of the 3D position is measuring a number of relative distances between the object and an array of emitter and receivers located in the 3D mouse. As described, this is done by measuring the reflected intensities of emitted signals, and the challenge eventually comes down to creating an algorithm which can adaptively design these signals to be optimal under given conditions.

In an ideal theoretical scenario there are four unknown variables; the 3D position and the reflectivity of the object, and hence only four distances are required. But in a real application all measurements are subject to uncertainty, and the reflectivity might not be homogeneous across the object. The consequence is that a larger number of relative distances are required, which inevitably increases the computational complexity. At the same time the real time requirement—combined with the desire to use only inexpensive hardware—limits the available computational power.

We present in this section a measuring method that is well suited for accommodating these opposing interest by
- exploiting the full potential of any combination of emitters and receivers,
- making all the measurements simultaneously,
- being highly accurate in moderate noise conditions,
- being very robust in severe noise conditions,
- being suitable for fixed point DSP implementation.

This is achieved by using two closely related digital signal design algorithms; a "best cases" and a "worst case" algorithm. The former is based on the wavelet transform (WT), while the latter is based on the Rudin-Shapiro transform (RST). They are both simple, numerically stable, and post-processing friendly, making them ideal for implementation in a fixed point DSP or a custom IC. By introducing a signal processor it becomes possible to continuously redesign the signals for improved SNR, and thereby increasing the potential for accuracy and robustness in changing and/or severe noise conditions.

We will not describe the popular WT in further detail. The RST is briefly presented below Designing the Digital Signals The two design algorithms are based on the wavelet packet transform scheme; it is fast numerically stable, works well in fixed point arithmetic, and has low program complexity. The best case algorithm uses the classical WT to create signals which are near-orthogonal to expected noise occurrences, while the other algorithm uses the RST to create an all-spectrum signal, which by nature has low sensitivity with respect to time and frequency located noise occurrences. The difference is essentially that the WT algorithm "searches for holes" in the current noise, while the RST algorithm spreads information in time and frequency to reduce the impact of localised disturbances. The preferred method depends on the noise conditions. If there are easy-to-find holes in the noise, the former can provide very accurate measurements. If, however, the noise is difficult to define or is changing rapidly, the latter method provides less accurate, but more robust measurements.

A good introduction to the wavelet theory from an applicational point of view is (Wickerhauser 1994). A mathematically rigorous treatment of the subject is given in (Daubechies 1992). For more material on Rudin-Shapiro polynomials, see (Brillhart 1973) and (Benke 1994).

The Wavelet Transform Design Method

The idea for designing a good transmission signal is the following. A designed, simple, and time localised signal is inversely wavelet packet transformed, Time localised means that in an otherwise vanishing sampled signal, there are a number of consecutive non-vanishing samples. Since these non-vanishing samples has an interpretation as coefficients of various time-frequency atoms, it is possible, by coordinating the design of the signal with the wavelet basis chosen for the inverse transformation, to create a signal with particular time and frequency properties.

After transmission the signal is forwardly transformed to reproduce the original, now noisy simple signal, and by inner product with the "clean" original signal the transmission intensity is determined. Since the original signal is completely known, it is also possible to obtain an estimated accuracy of the channel gain measurement This is accomplished by taking inner product between the transmitted, transformed signal and a number of signals orthogonal to the original signal. If these quantities are small the transmission was most likely subject to only mild noise. This trick provides an easily calculated guideline to how much one can trust the current measurement. It is also possible to apply a number of signal restoration procedures (not further described here). These also benefit from the complete knowledge of the original signal. Note that the small number of non-vanishing coefficients of the original signal in all cases significantly reduce the amount of calculations.

Because the transform is linear and has perfect reconstruction, it is also easy to make a good sample by sample estimation of the noise, which provides valuable information on any disturbances. This makes it possible to do real time adaptation of the signal by redesigning them. The methods combines the ability of the WT to produce predefined trade-offs between time and frequency information with the freedom in design of the original signal. Thereby it is possible to adapt the method to many types of noise.

The Rudin-Shapiro Transform Design Method

For a general presentation of the Rudin-Shapiro polynomials, please refer to Example 2. The flatness of the Rudin-Shapiro polynomials means that their coefficients constitute time series with a broad frequency content.

To produce such wide spectrum series we use the RST, which is really a wavelet packet Haar transform with time and frequency dependant impulse response. The RST has a number of nice properties, summarised in the following theorem, which also defines the RST itself.

Theorem 1 (The Rudin-Shapiro Transform)

Define the mapping $H_{j,m}:R^{2j}\to R^{2j}$, $j\geq 1$ as $$\begin{bmatrix} y_k \\ y_{k+2^{j-1}} \end{bmatrix} = \frac{(-1)^{mk}}{\sqrt{2}} \begin{bmatrix} 1 & (-1)^k \\ (-1)^m & -(-1)^{k+m} \end{bmatrix} \begin{bmatrix} x_{2k} \\ x_{2k+1} \end{bmatrix} \quad (11)$$

for $k=0,\ldots,2^{j-1}-1$ when mapping x to y. Define the Rudin-Shapiro transform as $$H_j \equiv \prod_{j=1}^{j} \begin{bmatrix} H_{j,0} & & 0 \\ & \ddots & \\ 0 & & H_{j,2^{j-1}-1} \end{bmatrix} \quad (12)$$

Then $H_J=[h_{m,n}]:R^{2^J}$ is a unitary and symmetric Hadamard matrix with $$h_{m,n} = 2^{-J/2} \prod_{j=1}^{J} (-1)^{(m_j+m_{j-i+2})(m_{j+1}+m_{2-j-1})}, \quad n,m=0,\ldots,2^J-1, \quad (13)$$

where $m_j$ is the j'th bit in the binary representation of m, with $m_1$ LSB. Moreover, $$\max_{\xi} \left| \sum_{m=0}^{2^j-1} h_{m,n} e^{i2\pi m\xi} \right| \leq \sqrt{2}, \quad n = 0, \ldots, 2^J - 1. \quad (14)$$

Note that $H_j$ is unitary because $H_{m,k}$ is unitary, that (14) is equivalent to (10) (see Example 2), and that it follows from (13) that $H_j$ is a symmetric Hadamard matrix. We omit the complete proof.

The theorem shows that the RST constitutes an orthonormal basis, which not only consists of uniformly scaled ±1, but also, due to (14), has a remarkable frequency response. In FIG. 4 is an example of such a basis element and its frequency response. The top graph of FIG. 4 shows the 37th basis vector of a size 64 Rudin-Shapiro transform. Below is the amplitude of the frequency response of the basis vector.

The brute force procedure for decomposing a vector in the RST basis is to multiply it with the inverse of $H_j$. However, the theorem shows that, not only is $H_j$ its own inverse, there is also a wavelet packet like scheme, given by (11) and (12), which performs the matrix multiplication with complexity O(JlogJ). Note that if the 2×2 matrix in (11) was replaced by the first of $$\begin{bmatrix} 1 & 1 \\ 1 & -1 \end{bmatrix}, \begin{bmatrix} 1 & (-1)^k \\ 1 & -(-1)^k \end{bmatrix},$$

then $H_j$ would be the all-scale inverse wavelet packet Haar transform. If replaced by the second matrix, the rows of $H_j$ would be the coefficients of the Rudin-Shapiro polynomials defined in (9). Neither of these are symmetric transforms.

The RST based algorithm is applied in much the same way as the WT method. A designed, simple signal is transformed prior to transmission, yielding an all-spectrum signal. Upon transmission the signal is transformed again, this time producing the original, simple signal with noise. The post-processing is equivalent to that of the WT method.

Determining the 3D Position

The second step of the 3D positioning is converting the relative distances into a 3D position by means of some mapping from a high dimensional space to $\Re^3$. This mapping defines the interpretation of any quality of measurement; perfect, good, bad, as well as completely wrong, and must do so in a very short time due to the real time requirement. The mapping should fulfil the following prioritised requirements:
1. It works well for good measurements,
2. there is a reasonable relation between error in measurements and error in 3D position,
3. it has low computational complexity,
4. it has low dynamic range in computations,
5. it is easily adaptable in real time.

Since the measurements are expected to be good most of the time, the primary concern is that the mapping does well in this case, and the second requirement ensures that a small decrease in accuracy does not result in too large deviations in the 3D position.

The Properties of the Neural Net

There are various ways of constructing this mapping ranging from completely theoretical, geometrical consideration to purely ad hoc methods. We have chosen a middle-road approach by using a neural net. On the one hand this offers a systematic and fairly well-described way of defining and describing the desired mapping, and on the other hand requires a lot of guessing and testing. Moreover, a neural net has the potential of fulfilling the above requirements, as is shown in the following.

In this particular framework there are two ways of using a neural net; as a classifier and as a function approximation. The former is useful if only one of a few possible positions is needed instead of the actual position. This applies, for instance, when pointing at icons on a monitor. In this presentation only the function approximation network is investigated, being the most interesting type in the case of the 3D mouse.

We have chosen to use a radial basis function network, because it is well-suited for function approximation, plus it requires only a relatively limited amount of training. For a more detailed description on radial basis function network, see (Chen et al. 1991).

Simulating the 3D Positioning

Figure 7:
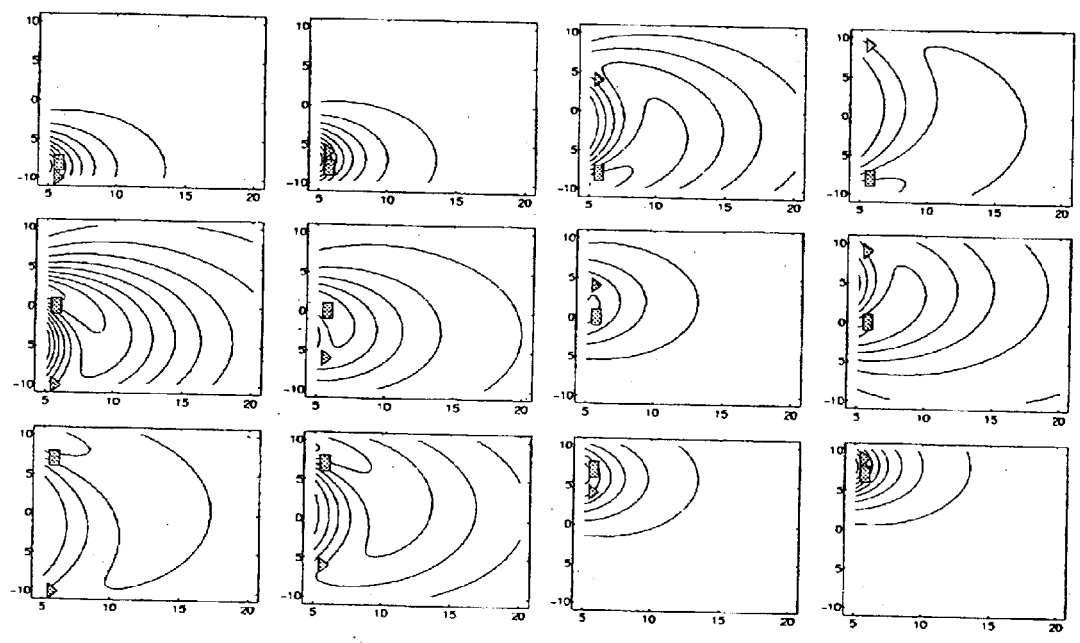
FIG. 7 shows the simulated reflection intensities.

FIG. 7 shows the simulated reflection intensities. The triangle is the emitter, and the square the receiver. The first two columns have the same colour scale, and so does the last two. The axis limits are the same as in FIGS. 8 and 9.

Figure 8:
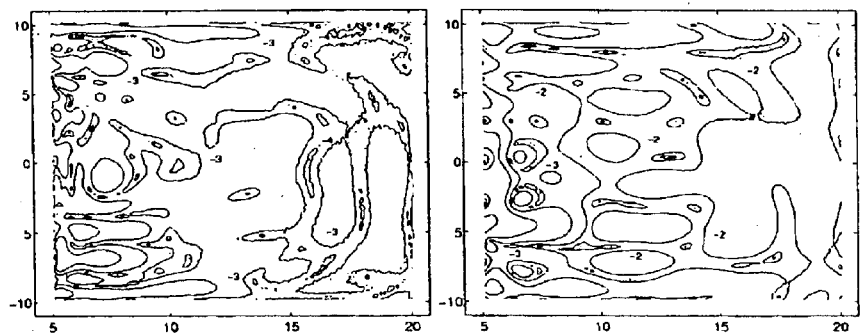
FIG. 8 shows-the error in distance between true 2D positions and 2D positions simulated by a neural net.

FIG. 8 shows the error in distance (Euclidean norm) between true 2D positions and 2D positions simulated by a neural net. The crosses mark the training points. The left set of training points yielded 82 neurons, while the right gave 57 neurons. The colour scale is $\log_2$.

Figure 9:
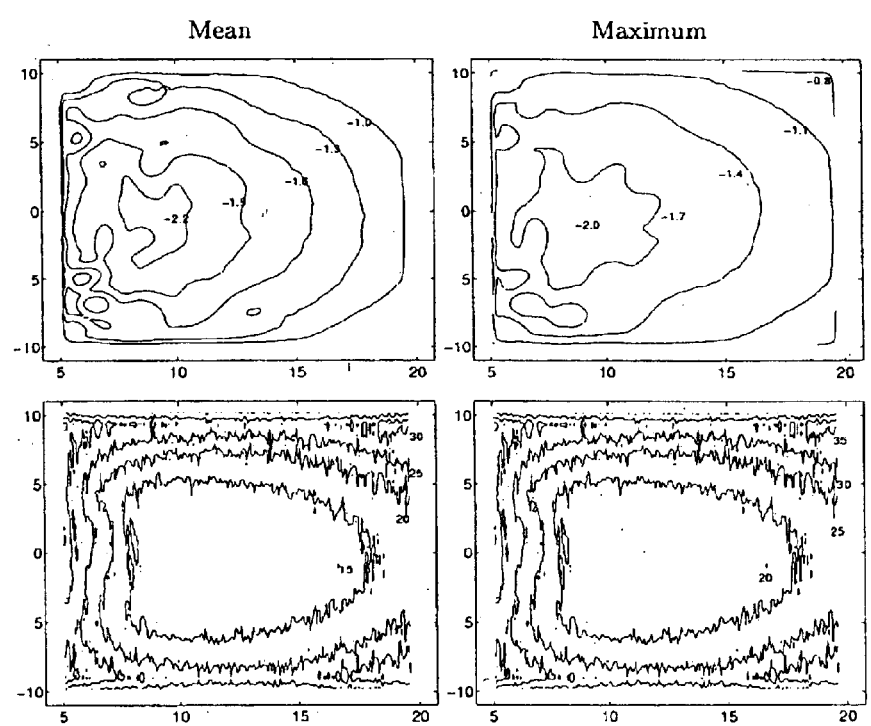
FIG. 9 shows the means and maximum distance error for 200 instances of Gaussian noise.

FIG. 9 shows the mean and maximum distance error for 200 instances of Gaussian noise (SNR range from 50 to 25 dB in the uppermost row, and to 5 dB in the lower row). The colour scale is $\log_2$.

To simulate the 3D positioning by a neural net it is necessary with measurement data from an array of emitters and receivers. Acquiring almost error-free data by means of a real electronic setup is difficult; it requires extensive work and expensive equipment Moreover, measurements are certain to be erroneous, simply because of the physics (light emission and reception is a quantum mechanical process subject to uncertainty). So, instead a model is used to produce the measurements. This is a rather complex and computationally heavy model, which simulates the reflection of a sphere at any given position by means of a ray-tracing like procedure. The model produces data close to equivalent real measurements. The model will not be discussed in further detail. We have chosen to present a 2D simulation, since this is much more suited for visual interpretation (plus it is significantly less computationally complex).

The setup consists of 4 emitters and 3 receivers located along a line (equivalent to location in a plane in the 3D mouse). The simulated measurements are shown in FIG. 7 along with the location of the emitters and receivers. Note that the overall intensity depends heavily on the distance between emitter and receiver. The size of each measurement set is 16×20units (which might be interpreted as centimeters). The idea is now to use a neural net to map the 12 dimensional measurements to a 3D position. The network is constructed by repeatedly adding neurons (which in this case are functions on the form $Ae^{-1^2}$) until the MSE between the true and simulated 2D position in a set of training points is below a threshold. While this procedure specifically reduces the error in certain points, the goal is to have a good approximation in all 2D points. The former does not necessarily imply the latter, as is shown in FIG. 8. Here two set of training points are used, and the MSE of all the training points are 0.3. In between the training points, however, there is no control of the error, which can easily become quite large. But adding training points in places with large error will inevitably also increase the number of neurons (to meet the MSE threshold requirement). One obvious goal is to have as few neurons as possible, but it is equally important that the neural net is not too sensitive to noise. To test this (on the neural net with 82 neurons) the net has predicted the 2D position based on 12 dimensional measurement data with added Gaussian noise. This is shown in FIG. 9. Since the added noise have the same variance all over the 16×20plane, while the measurements are varying in amplitude (as seen in FIG. 7), the SNR varies somewhat. Although the weaker noise is typical for laboratory tests, the stronger noise is not uncommon. This figure shows one major weakness of the neural net; the large sensitivity to even Gaussian noise (the scale is $\log_2$, so the predicted positions are useless).

The problem is that although the "clean" measurements are 12dimensional, they constitute a 3 dimensional submanifold since they are originally mapped from $'R^3$. If a 12 dimensional measurement is too far from this embedded submanifold the prediction make by the neural net becomes arbitrary and hence useless. We have two potential solutions to this; the neural net could be trained for erroneous data as well, or some projection onto the 3D submanifold could be applied in the 12 dimensional data space. We have tested the former idea with positive result, but a significantly larger number of neurons is needed, since an even more complicated structure than the 3D submanifold is approximated. The latter solution is somewhat more complicated, because it requires a fine-gridded non-Euclidean multi dimensional structure (consisting of splines, for instance) of the 3D submanifold in order to facilitate computation of a numerical projection, as an analytical projection is not feasible. We have not yet tested this idea.

Conclusion

We have proposed to construct a 3D positioning system by combining a computational simple and robust algorithm for measuring relative distances with a neural network. The former is based on the wavelet and the Rudin-Shapiro transforms, which are well suited for moderate and severe noise conditions, respectively. They both have low program and computational complexities in addition to good numerical properties, making them suitable for low cost hardware implementation. The neural network presents some difficulties, and some work still remains to be done in this context. One untested possibility is using wavelets as basis function in the neural net; we expect this to reduce the number of neurons because of the greater flexibility of wavelets compared to Gaussian functions. However, the preliminary simulations indicate that this method for converting relative distances into 3D positions has significant potentials.

EXAMPLE 5

Method For Determining Position of Objects in Front of a Monitor

Introduction

In many applications it is desirable to operator an apparatus equipped with a monitor without using a keyboard or the like. It is commonly known that a touch screen is a solution to this problem. The idea of the touch screen is that both information and "buttons" are located on the screen, and that the screen is sensitive to touch in two or three dimensions, that is the position on the screen—and possibly the pressure—of the touching object is determinable. We propose a method for acquiring that same information without the need for physical contact. Pressure is replaced by distance to the screen. The method relies on the ability of the screen to emit light (or indeed any kind of signal that can be modulated, like electromagnetic or acoustic waves) which can changes spatially and/or temporally. That is the emitted signal can change location on the screen and/or vary in time. This requirement is for instance fulfilled by any TV or computer monitor. We propose two different approaches; one where parts of or the entire screen is continuously illuminated, and one where the objects are tracked as they move.

Description of the Idea

We want to determine the position of one or more objects located in the immediate vicinity of the front of a monitor. In the following we will refer to one or more objects as "object". This object would typically be a finger or a pen, or another object of relatively little spatial extension in directions parallel to the monitor plane. We propose to do this by letting the monitor itself illuminate the object with some kind of signal, which depends of the capabilities of the monitor. This would typically be an electromagnetic signal within a limited range of frequencies. Alternatively a dedicated monitor for the purpose described could be used. Such a monitor would for instance emit auxiliary signals in predetermined, suitable frequency ranges, such as infra red and ultra-violet. For any monitor, at locations around it, a number of receivers is positioned. The emitted light is reflected by the object onto these receivers, thus making it possible to determine the position of the reflecting object.

There are basically two different ways of doing this. Either the timing of the updating of the image on the monitor can be used, or the distances between the reflecting object and receivers can be used. The former relies on the typical method for updating monitor images, which is sequential excitation of each pixel on the monitor. Whenever the pixels close to the object are updated the change in the state of these pixels (typically originating in the beam of electrons used to excite the pixels) is reflected by the object onto the receivers. Since it is known when each pixel is excited it is possible to determine the position of the reflecting object. This method requires synchronisation of the monitor image updating and the signal processing of the received signals.

The other method is via measurements of the distances between the object and the receivers. If the absolute distances between the object and at least two (in some cases three) receivers are known, it is a relatively simple matter to determine the position. The distances can be found through time-of-flight, triangularisation, relative distances based on reflected intensity, or some other mean. The relative distance approach requires one extra receiver, and advanced signal processing. More receivers can be added to increase accuracy and robustness.

The method that uses distances between the object and the receivers can be implemented in two different ways, as mentioned in the introduction. One method is to illuminate parts of the screen (or the entire screen) either at once or each pixel (or sets of pixels) sequentially (with for instance a vertical line moving across the screen). Another method is to track the object in the sense that a number of pixels in the vicinity of the object illuminates. When the object moves the illumination follows.

It will further be possible to do some intelligent de-noising combined with determination of the quality of measurements. The extend of this is determined by the positioning method chosen. By spatial and/or temporal modulation of the illumination, the colour, and the intensity, the emitted signal can be assigned some distinct features making it both separable from signals from external sources and suitable for a quality measurement.

Finally, the above functionality can be achieved at a greater distance using the ideas of the "3D mouse" described in Examples 3 and 4. In that case external emitters are added.

EXAMPLE 6

Method for Determining 3D Position of Remote Control

Introduction

It has in recent years become possible to direct sound produced by ordinary speakers in a given direction by performing suitable alterations of the sound signal. One application of this is directing the sound from a hi-fi sound system towards the listener wherever he may be located. This is vital for producing the correct stereo effect, for instance. The need for determining the position of the listener is evident.

We propose a method for determining the position of a remote control, for electronic equipment such as sound systems, TV sets, and other applications operated by a remote control. This method applies equally well if a device similar in function to a remote control is used. One particular application of this invention is the locating of the position of the listener in three dimensional space, provided that the listener is close to the remote control.

The determination of position is done by measuring the signals produced by the remote control. By comparing the signal intensity from the remote control at different points on the remotely controlled apparatus the direction and distance of the remote control can be found.

Description of the embodiment

The basic technology for this embodiment has previously been described by the authors (see Examples 1–4). This includes methods for determining the intensity of transmitted signals, i.e. channel gain measurements, methods for validating reception, and methods for various means of handling signals which are damaged or heavily distorted during transmission.

This embodiment is therefore the use of such measurements to determine the 3D position of the remote control. This is done through a series of geometrical equations based on the differences in the measured intensities for receivers located at different position, either on the remotely controlled apparatus itself, or via some other receiver equipment positioned at suitable locations. The geometrical equations are combined with an approximation of the transfer function from the remote control to the apparatus, and this function is mainly based on the knowledge of the characteristics of the equipment. The physical manifestation of the signals are either electromagnetic or acoustic waves.

The measurement procedure can be automatic, that is performed by the remote control without specific user request, continuously, with time intervals, or whenever the remote control is operated. The procedure can also be user dependent, meaning that the user is required to take certain actions to indicate that 3D positioning is desired.

The method might rely on calibration, either once, frequently, or constantly. This can be done either automatically or by the user. The method might use the signals already encoded in the remote control and/or the existing electronic equipment, such as diodes and photo diode, or the method might require new signals and/or electronic equipment to be implemented.

EXAMPLE 7

A Method for Reducing Signal Cross Talk in Electrical Circuits

Introduction

Cross talk is a phenomenon occurring in all sorts of electronic equipment. It means that a signal that is intentionally present in one conductor is, at the same time, unintentionally present in one or more other conductors although usually significantly damped. In many applications this is a problem, in some cases even a severe problem. We therefore propose a method for reducing this cross talk. The methods probably will have to rely on the possibility for digital signal processing before and after the cross talk occurs.

Description of the Idea

In a conductor, typically a wire on a printed circuit board, in a semiconductor component or in any component with inductance, a signal is transmitted. The other components in the device will all receive more or less of that signal. If there is a large amplification somewhere in the device this point is particularly sensitive. Unfortunately the cross talk Is in some cases not immediate visible, for instance if the signals in the two wires differ only in amplitude. The cross talk then simply increases the signal. In an application where the amplitude of the signal is vital this is a major problem.

In our particular application the signals in the two wires are sampled signals, i.e. they are piece-wise constant in time, and they are supposed to be proportional. One signal is emitted as infra red (IR) light, while the other signal (in the other wire) is the intensity of light received with an infra red photodiode. Since the received light is very weak it is amplified significantly. All the solderings and wires from the receiver to the amplifier is hence sensitive to cross talk. Since the signals are not only sampled but also constructed and post-transmission processed by a wavelet transform, we propose to use the properties of this transform to determine the occurrence of cross talk.

By inserting a delay of a number of samples right before the transmitting diode the signal in the emitter circuit and the signal in the receiver circuit are time shifted this number of samples. Certain signals demonstrates very nice behaviours when shifted in the wavelet domain, and by transmitting such signals it is possible to separate the shifted (desired) and non-shifted (undesired) signals, and hence determine the contribution resulting from cross talk. Such a signal can be transmitted with frequent intervals to keep track of the cross talk, or continuously if the cross talk is expected to vary rapidly. The cross talk detection signal and the IR signal can also be transmitted simultaneously. This is possible due to the properties of the wavelet transform. Finally, the IR detection signal itself can be used for determining the effect of cross talk. This restrains the range of usable signals, however.

EXAMPLE 8

Low Rate Wavelet Based Data Transmission

Introduction

We propose a method for adaptively designing the set of commands which are used in low rate data transmission such as in a remote control for a consumer electronics product, e.g. a compact disc player. In a typical setup the set of commands, the alphabet, is designed to accommodate a worst case situation with respect to perturbation of the transmitted commands, the letters of the alphabet. Since this situation rarely arises an unnecessary redundancy exists in such a system. We therefore propose a method for designing an alphabet which suits a particular situation, and which can be redesigned whenever improvements are achievable by doing so. The design parameters are based on previous transmissions. The design of the letters, the signals to be transmitted, are done using well-known time domain methods and the wavelet transform.

This embodiment of the present invention is the combination of complete design freedom of the letters in the time domain and the use of the wavelet transform to construct a suitable alphabet, to decode received signals, and to extract properties of the transmission. The latter is useful for redesigning the alphabet and for adjusting the parameters of the wavelet transform in any future transmission.

Note that "low rate" refers to the use of an alphabet, where each letter consists of certain amount of information, which typically has a high redundancy to improve robustness. Note also that due to the huge variety of terminology in the broad area of data transmission, the words "low rate", "letter", and "alphabets" might be different in relevant literature.

Background

The transmission of one of a finite set of letters, an alphabet, is known prior to this invention. There also exist various methods for generating an alphabet, such that each letter has a unique signature. This embodiment of the present invention is mainly a new method for generating such alphabets.

In the following a remote control system for a compact disc player is used for descriptive purposes. This does not mean that the described method is limited to this application. It should however be fairly straight-forward from the description below for experts in any relevant field how to incorporate the method in other applications.

In a typical setup the communication between the remote control and the compact disc player consists of a number of commands, such as "Play", "Pause", "Stop", transmitted from the remote control to the compact disc player. Each command consists of a unique, predetermined signal with finite temporal extension, in this document referred to as a letter. Each letter must fulfil the following to opposing requirements: It must contain enough information to ensure a sufficiently high probability of reception and correct interpretation, and not contain more information than can be transmitted within a sufficiently short period of time. Moreover it is desirable to minimise the energy consumption of there mote control, and hence the amount of energy used for transmission should be as low as possible; again requiring a minimum of transmitted information.

It is therefore desirable to use an alphabet which is tailored to the particular circumstances including noise from various sources, distortion of the transmitted signal, changes in electronic equipment due to ageing, temperature changes, and in wireless communications dust and dirt on the emitter and receiver. Since the circumstances are usually not known very accurately prior to implementation, it is necessary to use an alphabet which has "a high probability of success", i.e. the alphabet can deliver the desired information in a given worst case scenario. This inevitably leads to unnecessary redundancy in most events of transmission, that is when the conditions are more lenient than in the worst case scenario.

Description of the Embodiment

This embodiment of the present invention is concerned with the design of an alphabet. We propose to design the letters as signals in the time domain followed by a wavelet transform. From a mathematical point of view, it is a fairly simple task to design a limited number of temporal signals which have the property of both easy and complete, distinction. One example is orthogonal signals. Transmitting a signal designed in the time domain can, however, be troublesome, since the perturbation of the signal during transmission often occurs in both the time and the frequency domain.

Hence this embodiment of the present invention is to apply the wavelet transform to each letter prior to transmission, and to utilise properties of the wavelet transform in conjunction with the redundancy in the transmitted signal to determine some properties of the perturbation of the signal upon reception. This in turn can lead to actions such as retransmission, a perturbation of the alphabet (i.e. redesigning some or all of the letters), determination of noise and/or distortion properties, fixing damaged signals, and reduced precision for damaged or partly received signals. Some of the proposed actions require two way communication.

The possibility for these different actions reduces the requirements for the amount of information needed in the alphabet, partly because this method can cope with lost and damaged signals, partly because it is possible to design an alphabet which suits any particular situation eliminating the need for an alphabet capable of handling a worst case situation which is not realistic.

The wavelet transform itself has a number of properties which make it specifically appropriate to the application. These include: linearity, preservation of energy, perfect reconstruction, easy implementation, low computational complexity, good handling of short signals, and proportionality of perturbations in a signal before and after transformation.

To demonstrate how a transmission is done, and how the wavelet transform is exploited, the following is a description of transmission of a single letter. A time domain signal is designed and wavelet transformed. If information about the noise is available prior to transmission this can be used to tailor the signal and the particular wavelet transform employed to reduce the impact of the noise. If for instance the noise is concentrated in a particular frequency band the signal and the wavelet transform is adjusted to use other frequencies.

The transmission of the signal introduces some unknown perturbations of the signal. Upon reception the signal is inversely transformed. Due to the many properties of the wavelet transform, some described above, it is in most cases—even under severe noise conditions—possible, to determine which of the possible letters were transmitted. Once the letter is determined this information can be subtracted from the received signal, yielding information about the perturbation, in particular the noise contribution, which occurred during transmission. Should the received signal be unidentifiable the signal can be retransmitted with another time-frequency signature.

The freedom to design and redesign the transmission signals combined with the means for reallocating the signal in time and frequency, makes it possible to accommodate for virtually any type of perturbation. Moreover it is possible to adapt the alphabet to a given situation, which incidentally reduces the need for information whenever the perturbations are small or vanishing.

EXAMPLE 9

Improving the Robustness of PAS Measurement System

Description of PAS

Figure 10:
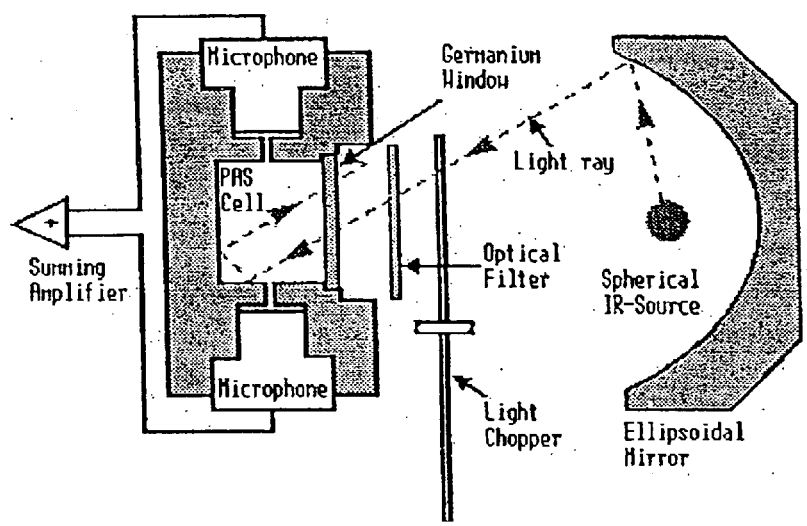
FIG. 10 shows the Innova AirTech Instruments PAS system.

In PhotoAcoustic Spectroscopy (PAS) the gas to be measured is irradiated by intermittent light of pre-selected wavelength. The gas molecules absorb some of the light energy and convert it into an acoustic signal which is detected by a microphone. PAS is an inherently very stable method for detecting very small concentrations of gas. FIG. 10 shows th Innova AirTech Instruments PAS system. The IR-source is a spherical black body heated to approximately 800° C. An ellipsoidal mirror focuses the light onto the window of the PAS cell after it has passed the light chopper and the optical filter. The chopper is a slotted disk which rotates and effectively "switches" the light on and off. The optical filter is a narrow-band IR interference filter. After passing through the germanium window, the light beam enters the PAS-cell. The surface of this cavity is highly reflective and the light beam is therefore reflected off the walls of the cell thus doubling its intensity. If the frequency of the light coincides with an absorption band of the gas in the cell, the gas molecule will absorb part of the light. The higher the concentration of gas in the cell, the more light will be absorbed. As the gas absorbs energy, it is heated and therefore expands and causes a pressure rise. As the light is chopped, the pressure will alternately increase and decrease—an acoustic signal is thus generated. The acoustic signal is detected by two microphones which are acoustically connected to the cell via narrow channels. The electrical output signals from the two microphone signals are added in a summation amplifier, before they are electronically processed. By using two microphones in the shown configuration, the systems vibrational sensitivity is considerably reduced.

Advantages of PAS

Photoacoustic gas measurement is based on the same basic principles as conventional IR-based gas analysers, namely the ability of gases to absorb infrared light. However there are some important differences between PAS and these conventional techniques. In a standard IR-analyser, the energy absorbed by the gas sample is measured indirectly, by measuring the transmission through the measurement chamber and comparing it to that through a reference cell. With PAS the amount of infrared light absorbed is measured directly, by measuring the sound energy emitted on the absorption of light. This means that PAS is highly accurate, with very little instability. For example, zero point drift is almost non-existent as zero is always reached when there is no gas present If no gas is present, there can never be an acoustic signal. Furthermore, with PAS all gases and vapours can be monitored simultaneously in a single measurement chamber as it is possible to make the signal for each substance to be monitored individually detectable. Another difference is that IR- analysers are optical; the transmitted signal is picked-up by a photo-sensor. In the PAS system, an optimised condenser, microphone is used as a detector. Innova AirTech Instruments have many years of experience with such microphones; those used as detectors in the gas monitors are of an exceptionally high quality. This confers a high degree of stability and reliability on the analytical procedure, and as a result the monitors rarely requires calibration.

Modifying the Light Chopper for Increased Robustness of Measurements

Figure 11:
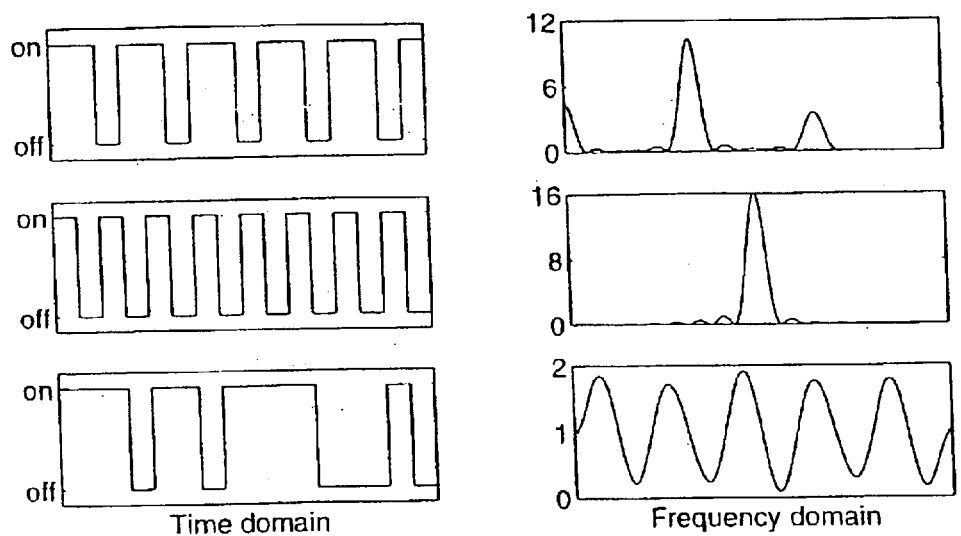
FIG. 11 shows the different type of on/off signals.

The light chopper described above is a "slotted disk which rotates and effectively switches the light on and off". Although it is not immediately apparent from the figure or the description, we suspect that this chopper produces a square wave signal with the same length "on-period" and same length "off-period", perhaps even same length "on-and-off-period". Both types of signals are shown in FIG. 11 as the left two upper-most graphs. These signals are quite concentrated in the frequency domain, as shown by the right two upper-most graphs, which are the Fourier transforms of the respective signals. This has the advantages that disturbances of the PAS system at frequencies somewhat different from these particular frequencies have low impact on the measurement. On the other hand any disturbances at these particular frequencies have a high impact on the measurement. Combined with that fact that frequency located disturbances are quite common (for instance in the form of vibration from other machinery), this makes the frequency concentrated signals less suitable for the PAS system.

We therefore propose to use another type of on/off signal, which is not concentrated in frequency, but specifically designed to span the entire frequency range (referred to as a spread spectrum signal). Such signals are shown in the lower-most graphs in FIG. 11. This, of course, means that any disturbances has impact on the measurements. But the impact is more or less proportional to the disturbances. This property makes the measurement much more robust compared to the original PAS system. The spread spectrum signal can be constructed in different ways. One possibility is via the Rudin-Shapiro polynomials.

Two major alteration of the PAS system is required to use our proposal. Firstly the slotted disc must be made with holes and not-holes to accommodate the spread spectrum signal. Secondly a DSP (or some kind of electronic equipment capable of signal processing) is needed. The signals from the microphones must be digitally processed to make the desired measurements. When introducing a non-cyclic signals some kind of synchronisation is needed, that is the DSP must know when the spread spectrum signal starts. This can either be done mechanically or digitally. The former solution is, implemented through a marker on the rotating disc indicating when the signal is repeated. The latter solution will use some property of the spread spectrum signal, such as the autocorrelation, to determine when the signals starts.

The spread spectrum signals are described in more detail in Example 2.

Thus, a method has been disclosed which is very robust, the method allowing for choosing a linear transform to generate a particular signal and to use the transform to obtain information relating to elements of the signal path Further, the disclosed method improves the determining of channel gain between one or more emitter(s) and one or more receiver(s), the method being fast as well as robust, and wherein the battery power required is reduced as compared to known systems, the received signal still being resolvable, even if it is very noisy.

Also, a method for determining the position of an object placed in the signal path has been provided, as well as a pointing device for a computer, the pointing device overcoming the problems mentioned in the introduction, in particular by providing a more natural way of performing three dimensional movements on the computer screen.

Finally, a method has been provided for eliminating or at least to a certain extend reducing the unintentional occurrence of a signal in one conductor of electronic equipment, the signal being intentionally present in another conductor of the equipment (so called "cross talk").

References

G. Ben ke, Generalized Rudin-Shapiro systems, J. Fourier Anal. Appl., 1(1):87–101, 1994.

J. Brilihart, On the Rudin-Shapiro polynomials, Duke Math. J.,40:335–353, 1973.

J. S. Byrnes, Quadrature Mirror Filters, Low Crest Factor Arrays, Functions Achieving Optimal Uncertainty Principle Bounds, and Complete Orthonormal Sequences—A Unified Approach, App. and Comp. Harm. Anal., 1:261–266,1994.

R. Caiderbank, I. Daubechies, W. Sweldens, and B.-L. Yeo, Wavelet transforms that map integers to integers, Appl. Comput. Harmon. Anal., 5(3):332–369,1998.

S. Chen, C. F. N. Cowan, and P. M. Grant, Orthogonal Least Squares Learning Algorithm for Radial Basis Function Networks, IEEE Trans. Neural Net., 2(2):302–309, Mar. 1991.

I. Daubechies, Ten Lectures on Wavelets, vol. 60 of CBSM-NSF Regional Conference Series in Applied Mathematics, SIAM, Philadelphia, Pa., 1992. (Daubechies 1992)

I. Daubechies, Orthonormal bases of compactly supported wavelets, II, Variation on a theme, SIAM J. Math. Anal., 24(2):499–519, Mar. 1993. (Daubechies 1993)

I. Daubechies and W. Sweldens, Factoring wavelet transforms into lifting steps, J. Fourier Anal. Appl., 4(3):245–267, 1998. (Daubechies 1998)

F. Fekri, R. M. Mersereau, and R. W. Schafer, Theory of wavelet transform over finite fields, Proceedings of IEEE ICASSP, III:1213–1216, Mar. 1999.

C. Herley, J. Kovacevic, K. Ramchandran, and M. Vetterli, Tilings of the time-frequency plane: Construction of arbitrary orthogonal bases and fast tiling algorithms, IEEE Transactions on signal Processing, 41(12):3341–3359, Dec. 1993. (Herley 1993)

C. Herley and M. Vetteirli, Orthogonal time-varying filler banks and wavelet packets, IEEE Transactions on Signal Processing, 42(10):2650–2663, Oct. 1994. (Herley 1994)

W. Rudin, Some theorems on Fourier coefficients, Proc. Amer. Math. Soc., 10:855–859, 1959.

W. Sweldens, The lifting scheme: A construction of second generation wavelets, SIAM J. Math. Anal, 29(2):511–546, 1997.

M. Vetterli and J. Kovacevic, Wavelets and subband coding, Prentice-Hall, 1995.

M. V. Wickerhauser, Adapted Wavelet Analysis from Theory to Software, A K Peters, May 1994.

What is claimed is:

1. A method for determining the channel gain(s) between one or more emitter(s) and one or more receiver(s), the method comprising the steps of
    emitting a first output signal by means of a first emitter, the first output signal being deterministic and containing an interval of frequencies,
    receiving a first input signal by means of a first receiver,
    determining a transformed first input signal by transforming said first input signal by means of a predetermined linear transform,
    determining a first channel gain by means of comparison of said transformed first input signal and a predetermined original first signal being equal to said first output signal being emitted and received noiselessly with a known channel gain and being transformed by means of said linear transform,
    determining the original first signal from an obtained measure of noise applied to the first input signal, said measure of noise being obtained from a comparison of a prior transformed first input signal and the respective prior original first signal.

2. A method according to claim 1, wherein the step of determining a transformed first input signal further comprises the step of transforming said first input signal by means of at least a second predetermined linear transform.

3. A method according to claim 1, wherein the step of determining a transformed first input signal is performed by using a linear transform of full rank.

4. A method according to claim 1, wherein the step of determining a transformed first input signal is performed by using a convolution transform.

5. A method according to claim 4, wherein the step of determining a transformed first input signal is performed by using a spectral transform.

6. A method according to claim 5, wherein the step of determining a transformed first input signal is performed by using a spread spectrum transform.

7. A method according to claim 5, wherein the step of determining a transformed first input signal is performed by using a sine or cosine transform.

8. A method according to claim 5, wherein the step of determining a transformed first input signal is performed by using a local sine or local cosine transform.

9. A method according to claim 1, wherein the step of determining a transformed first input signal is performed by using a unitary transform.

10. A method according to claim 1, wherein the step of determining a transformed first input signal is performed by using a wavelet transform.

11. A method according to claim 1, wherein the step of determining a transformed first input signal is performed by using a Hadamard transform.

12. A method according to claim 1, wherein the step of determining a transformed first input signal is performed by using a Rudin-Shapiro transform.

13. A method according to claim 12, wherein the step of determining a transformed first input signal is performed by using a symmetric Rudin-Shapiro transform.

14. A method according to claim 1, which, prior to emitting the first output signal, further comprises the step of transforming the predetermined original first signal by means of a linear transform being the inverse transform of the predetermined linear transform, thereby obtaining the first output signal.

15. A method according to claim 1, wherein the step of determining the original first signal is performed repeatedly so as to obtain an adaptive determination of the channel gain.

16. A method according to claim 1, further comprising the step of choosing a suitable transform for transforming the first input signal, said step being performed prior to the step of determining a transformed first input signal, the choice being made based on a previously obtained measure of noise applied to the first input signal.

17. A method according to claim 1, wherein the step of emitting a first output signal is performed by emitting an electromagnetic output signal.

18. A method according to claim 1, wherein the step of emitting a first output signal is performed by emitting an acoustic output signal.

19. A method according to claim 1, wherein the step of receiving a first input signal is performed by receiving an electromagnetic input signal.

20. A method according to claim 1, wherein the step of receiving a first input signal is performed by receiving an acoustic input signal.

21. A method according to claim 1, wherein at least the transforming of the first input signal and the comparison of the transformed first input signal and a predetermined original first signal is performed by means of digital processing means.

22. A method according to claim 1, further comprising the step of reflecting the first output signal using an object, the step being performed prior to the step of receiving a first input signal.

23. A method according to claim 1, further comprising the step of transmitting the first output signal using an object, the step being performed prior to the step of receiving a first input signal.

24. A method according to claim 22, further comprising the step of obtaining information about the object.

25. A method according to claim 24, wherein the step of obtaining information about the object comprises obtaining information regarding at least part of a human being.

26. A method according to claim 1, further comprising the steps of
   emitting a second output signal by means of a second emitter, the second signal being deterministic and containing an interval of frequencies,
   receiving the first input signal by means of the first receiver,
   determining the transformed first input signal by transforming said first input signal by means of a predetermined linear transform,
   determining a second channel gain by means of comparison of said transformed first input signal and a predetermined original second signal being equal to said second output signal being emitted and received noiselessly and with a known channel gain,
wherein the predetermined original first signal and the predetermined original second signal are linearly independent.

27. A method according to claim 26, wherein the predetermined original signals are orthogonal.

28. A method according to claim 1, further comprising the steps of
   receiving a second input signal by means of a second receiver,
   determining a transformed second input signal by transforming said second input signal by means of a predetermined linear transform,
   determining a second channel gain by means of comparison of said transformed second input signal and the predetermined original first signal being equal to said first output signal being emitted and received noiselessly and with a known channel gain.

29. A method according to claim 1, further comprising the steps of
   emitting a second output signal by means of a second emitter, the second signal being deterministic and containing an interval of frequencies,
   receiving a second input signal by means of a second receiver,
   determining a transformed second input signal by transforming said second input signal by means of a predetermined linear transform,
   determining a second channel gain by means of comparison of said transformed second input signal and the predetermined original first signal,
   determining a third channel gain by means of comparison of the transformed first input signal and a predetermined original second signal being equal to said second output signal being emitted and received noiselessly and with a known channel gain,
   determining a fourth channel gain by means of comparison of the transformed second input signal and the predetermined original second signal,
wherein the predetermined original first signal and the predetermined original second signal are linearly independent.

30. A method according to claim 29, wherein the step of emitting the first output signal and the step of emitting the second output signal are performed by emitting signals being significant for each of the emitters.

31. A method according to claim 1, further comprising the steps of
   emitting a plurality of output signals by means of a plurality of emitters, each of the plurality of signals being deterministic and containing an interval of frequencies,
   receiving a plurality of input signals by means of a plurality of receivers,
   determining a plurality of transformed input signals by transforming each of the input signals of said plurality of input signals by means of a predetermined linear transform,
   determining a plurality of channel gains by means of comparison of said plurality of transformed input signals with each of a plurality of predetermined original signals each being equal to one of said plurality of output signals being emitted and received noiselessly and with a known channel gain,
wherein the predetermined original signals are linearly independent.

32. A method according to claim 31, wherein the step of emitting a plurality of output signals is performed by emitting signals being significant for each of the plurality of emitters.

33. A method according to claim 31, further comprising the step of
   determining the position of an object based upon the determined channel gains.

34. A method according to claim 33, wherein the position of the object is determined in three dimensions.

35. A method according to claim 34, further comprising the step of reflecting the emitted signals by the object, said step being performed after the step of emitting the signals, but before the step of receiving the signals.

36. A method according to claim 35, wherein the step of determining the position of an object comprises the steps of
   determining the channel gains,
   determining relative distances of the object, said relative distances being based upon the determined channel gains,
   converting the relative distances into a three dimensional position.

37. A method according to claim 36, wherein the step of converting the relative distances into a three dimensional position is performed by means of a neural network.

38. A method according to claim 36, wherein the step of converting the relative distances into a three dimensional position is performed by means of geometrical observations.

39. A method according to claim 33, further comprising the step of determining the motion of the object.

40. A method according to claim 33, further comprising the step of determining the spatial orientation of the object.

41. A method according to claim 1, further comprising the steps of
   detecting the presence of an object in the vicinity of at least one of the one or more emitter(s) and/or in the vicinity at least one of the one or more receiver(s) by means of comparing the determined channel gain with a predetermined threshold value,
   performing a predetermined action in case the determined channel gain exceeds said predetermined threshold value.

42. A method according to claim 41, wherein the step of performing a predetermined action is performed by opening a door being in the vicinity of the object.

43. A method according to claim 1, wherein the step of emitting a first output signal is performed by using a movable emitter, and wherein the step of receiving a first input signal is performed using at least two substantially stationary receivers, the method further comprising the steps of
   determining the distance between the emitter and each of the receivers from the determined channel gains, and determining the position of the emitter by combining the determined distances.

44. A method according to claim 43, wherein the emitter and the receivers are comprised in an audio system, the method further comprising the step of adjusting the loud speakers of the audio system according to the position of the first emitter.

45. A method according to claim 1, wherein the step of emitting a first output signal is performed by using a movable emitter, and wherein the step of receiving a first input signal is performed using at least three substantially stationary receivers, the method further comprising the steps of determining the mutual ratios between the determined channel gains, and determining the position of the emitter by combining the determined ratios.

46. A method according to claim 1, further comprising the steps of inserting a time delay before the step of emitting the first output signal, determining the contribution of the received input signal from other sources than the first output signal, reducing said contribution of the received output signal.

47. A method according to claim 46, wherein the step of determining the contribution of the received input signal from other sources than the first output signal is performed by autocorrelation between the predetermined original first signal and the transformed first input signal.

48. A method according to claim 46, wherein the contribution from other sources than the first output signal is originating from cross talk between electrical conductors on a printed circuit board.

49. A method according to claim 1, further comprising the step of obtaining information regarding the temperature of one or more parts of an object.

50. A method for transmitting signals, the method comprising the steps of selecting an output signal from a predetermined set of output signals, emitting the selected output signal by means of the emitter, receiving an input signal by means of a receiver, determining a transformed input signal by transforming said input signal by means of a predetermined linear transform, comparing the transformed input signal with a predetermined set of original signals, each of said original signals being equal to one of said output signals of the predetermined set of output signals being emitted and received noiselessly with a known channel gain and being transformed by means of said linear transform, and identifying the selected first output signal from said comparison.

51. A pointing device for a computer comprising emitter means for emitting one or more output signal(s), the signal(s) being deterministic and containing an interval of frequencies, receiving means for receiving one or more input signal(s), first determining means for determining one or more transformed input signal(s), the first determining means comprising means for transforming said input signal(s) by means of a predetermined linear transform, second determining means for determining one or more channel gain(s), the second determining means comprising means for comparison of said transformed input signal(s) and one or more predetermined original signal(s) each being equal to one of said output signal(s) being emitted and received noiselessly with a known channel gain and being transformed by means of said linear transform, converting means for converting the determined channel gain(s) into a three dimensional position of an object, and for converting said three dimensional position into a position of the pointing device.

52. A pointing device according to claim 51, further comprising data communication means for communication between the pointing device and an external computer device.

53. A pointing device according to claim 52, wherein the data communication means is wireless.

54. A pointing device according to claim 51, wherein the object is at least part of a human being.

\* \* \* \* \*